(12) United States Patent
Peterson

(10) Patent No.: US 11,794,559 B1
(45) Date of Patent: Oct. 24, 2023

(54) VISOR CLIP AND SUN VISOR ASSEMBLY EQUIPPED WITH VISOR CLIP

(71) Applicant: John Peterson, Clearwater, FL (US)

(72) Inventor: John Peterson, Clearwater, FL (US)

( * ) Notice: Subject to any disclaimer, the term of this patent is extended or adjusted under 35 U.S.C. 154(b) by 0 days.

(21) Appl. No.: 17/887,420

(22) Filed: Aug. 13, 2022

Related U.S. Application Data

(60) Provisional application No. 63/328,305, filed on Apr. 7, 2022.

(51) Int. Cl.
*B60J 3/02* (2006.01)

(52) U.S. Cl.
CPC .......... *B60J 3/0217* (2013.01); *B60J 3/0265* (2013.01)

(58) Field of Classification Search
USPC ........................................................ 296/97.1
See application file for complete search history.

(56) References Cited

U.S. PATENT DOCUMENTS

| | | | | |
|---|---|---|---|---|
| 5,538,311 A | * | 7/1996 | Fusco | B60R 7/05 40/658 |
| 7,543,880 B2 | * | 6/2009 | Wieczorek | B60J 3/023 296/97.1 |
| 8,960,762 B2 | * | 2/2015 | Huelke | B60J 3/023 40/643 |
| 10,421,408 B2 | * | 9/2019 | Stakoe | B60R 7/082 |

\* cited by examiner

*Primary Examiner* — Joseph D. Pape
(74) *Attorney, Agent, or Firm* — DP IP GROUP; Franco S. De Liguori

(57) ABSTRACT

A sun visor assembly includes a visor having a recess, a first clip portion, and a second clip portion configured to be integrally mounted in the recess of the visor. The second clip portion is configured for connection to the first clip portion to allow the first clip portion to undergo pivotal movement relative to the second clip portion between open and closed states of the first clip portion. The first and second clip portions together form a cavity for securely accommodating and releasable holding an item in the closed state of the first clip portion.

20 Claims, 23 Drawing Sheets

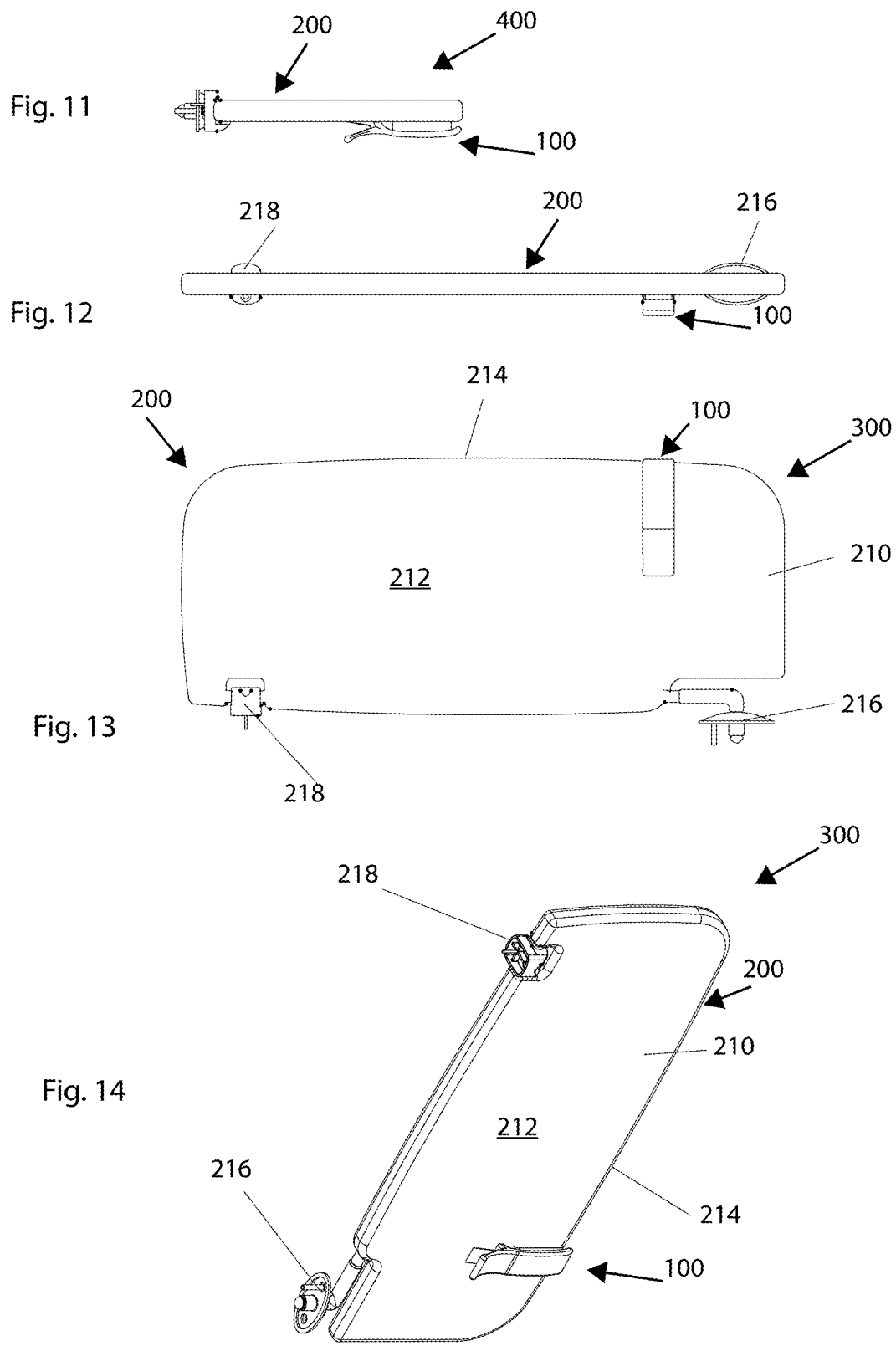

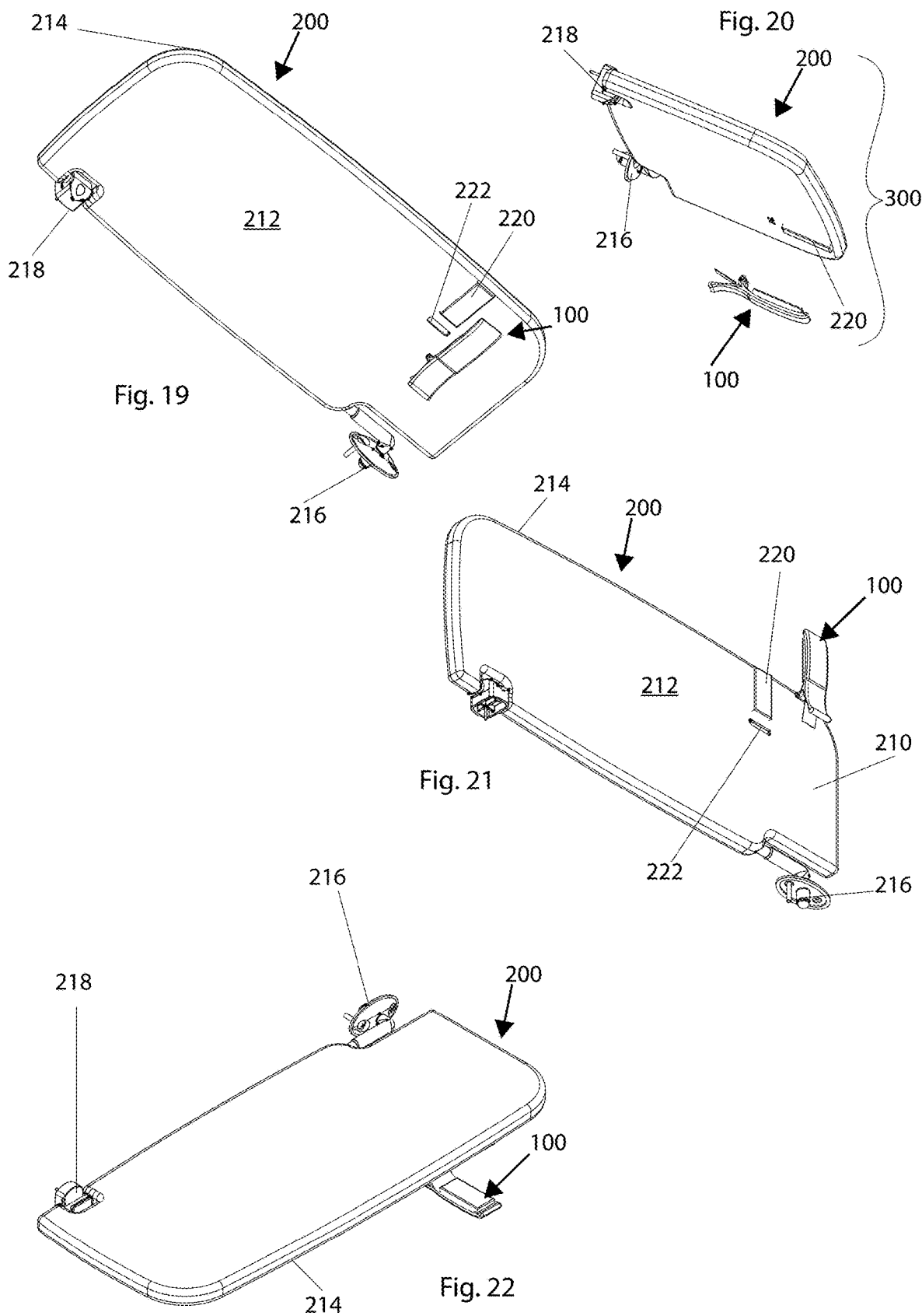

Fig. 23
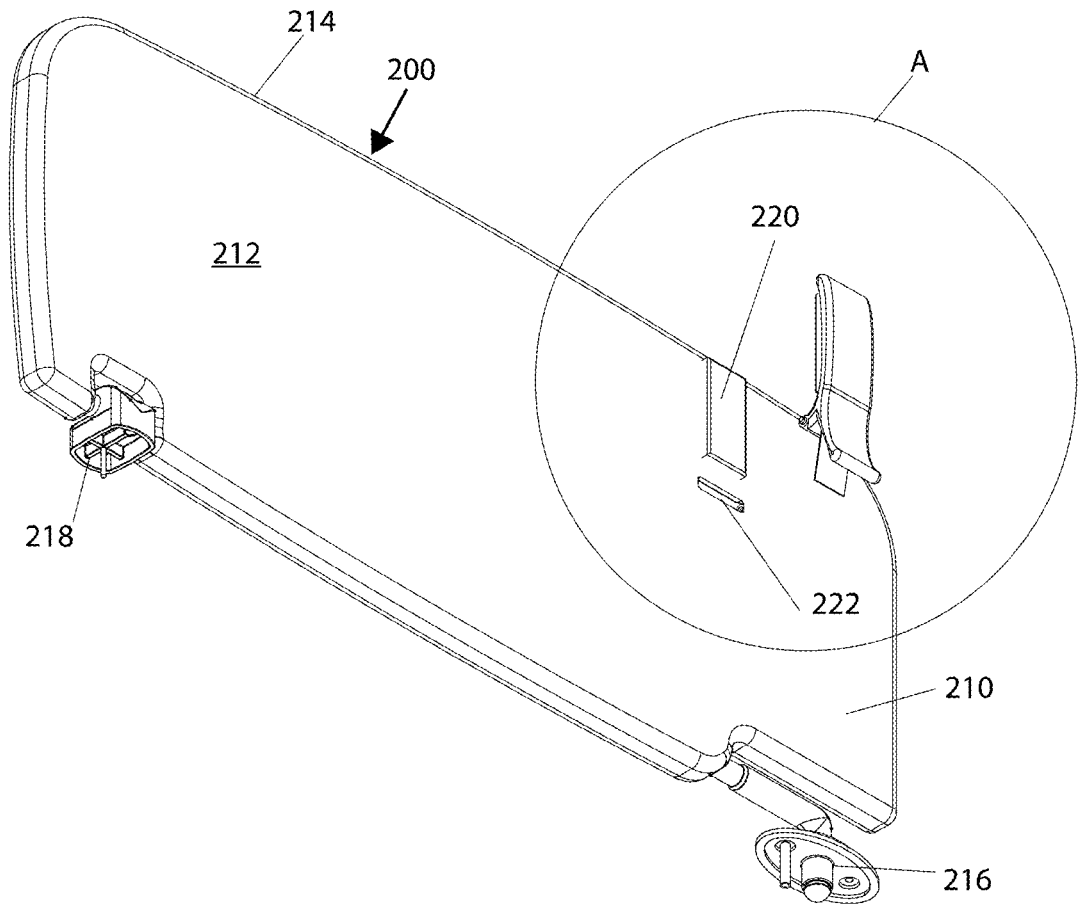
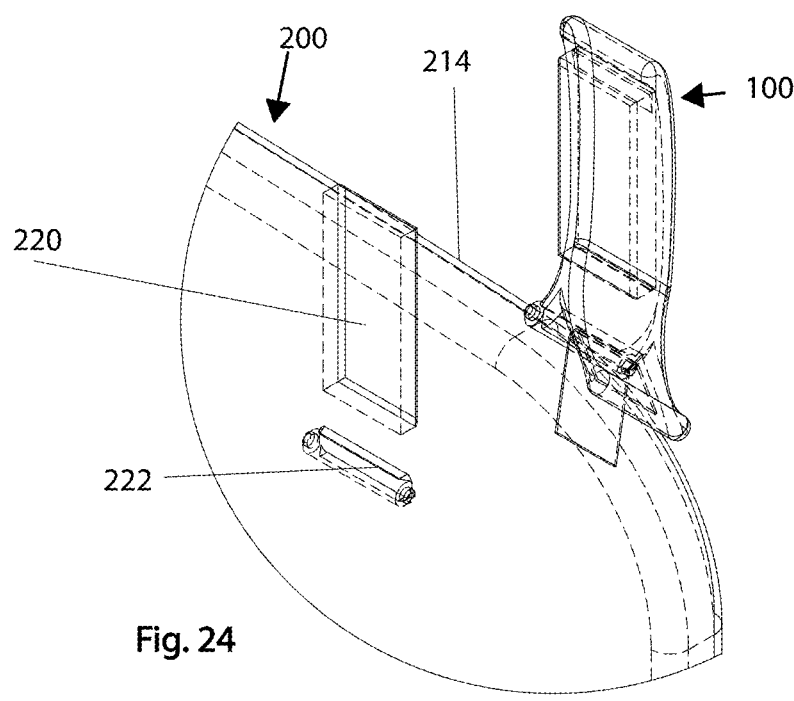
Fig. 24

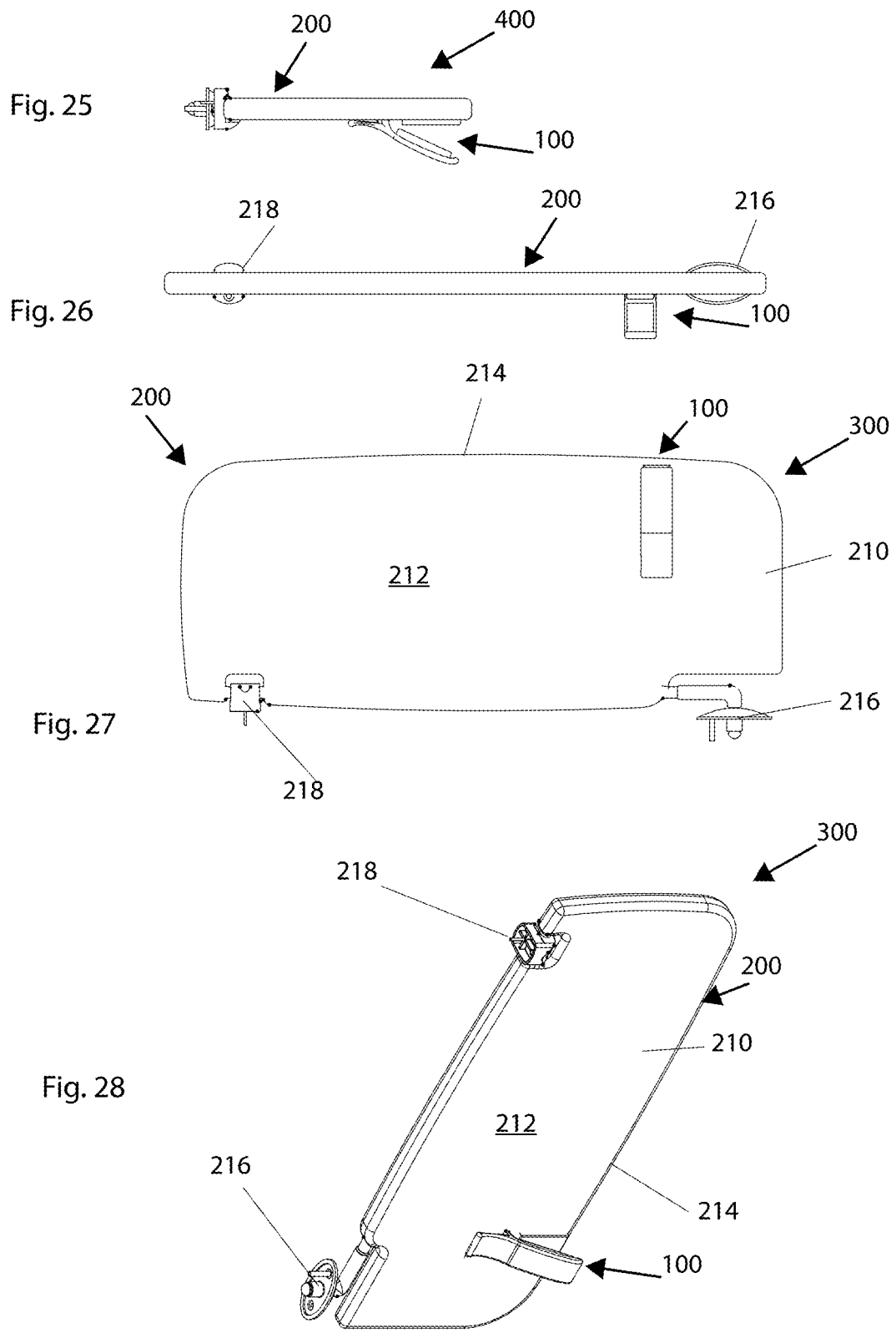

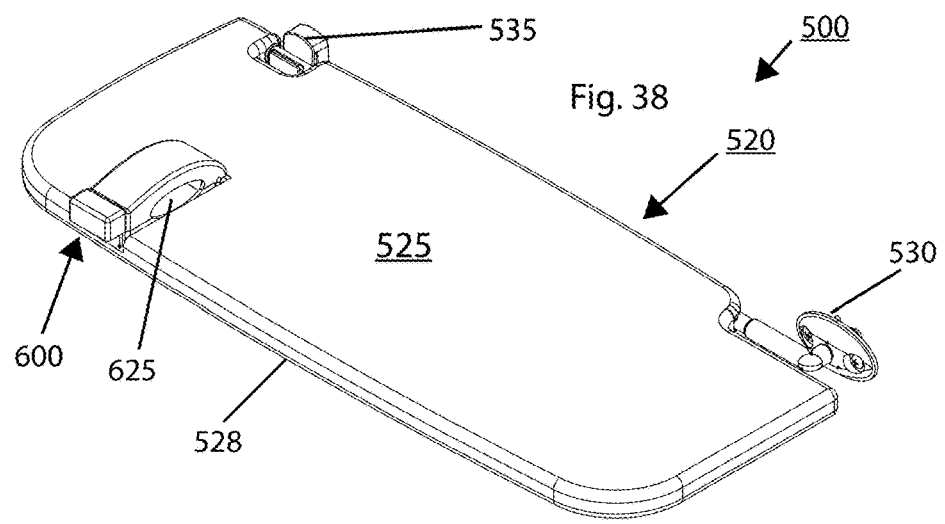
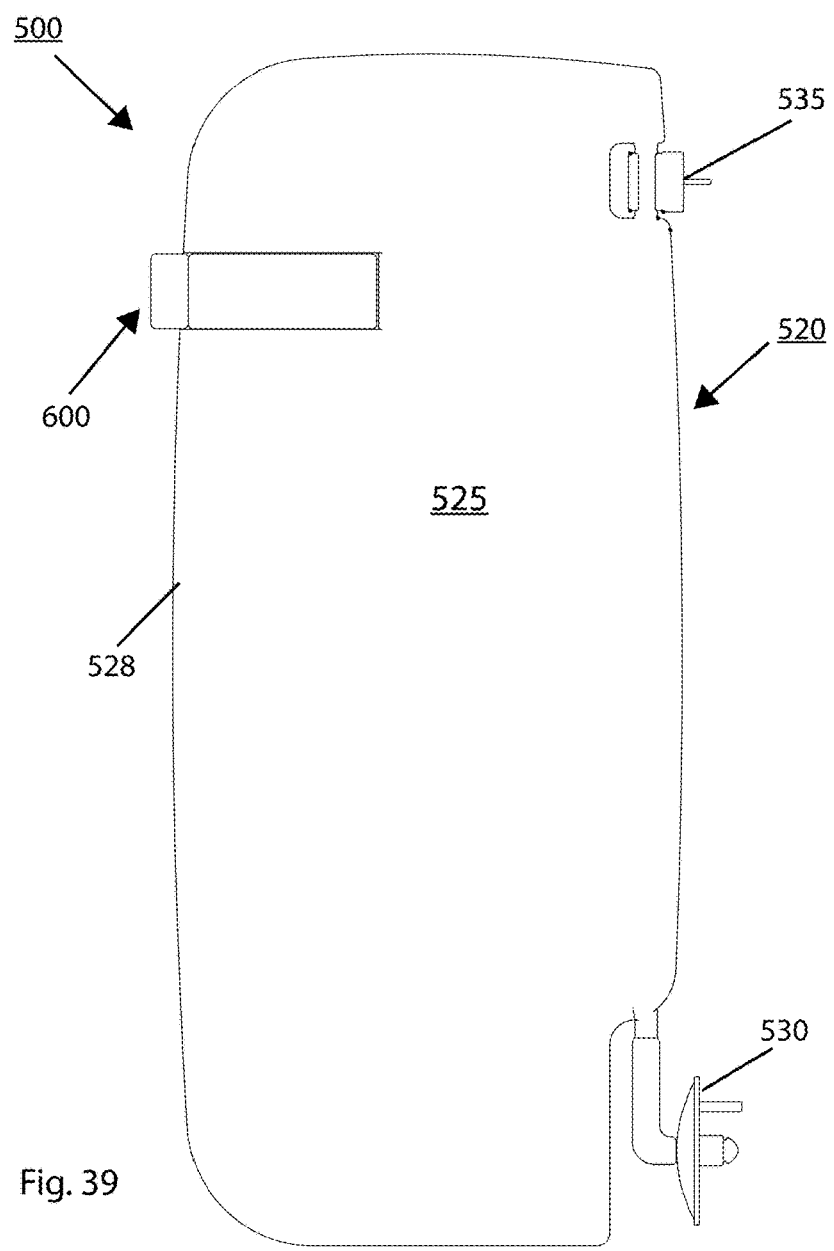

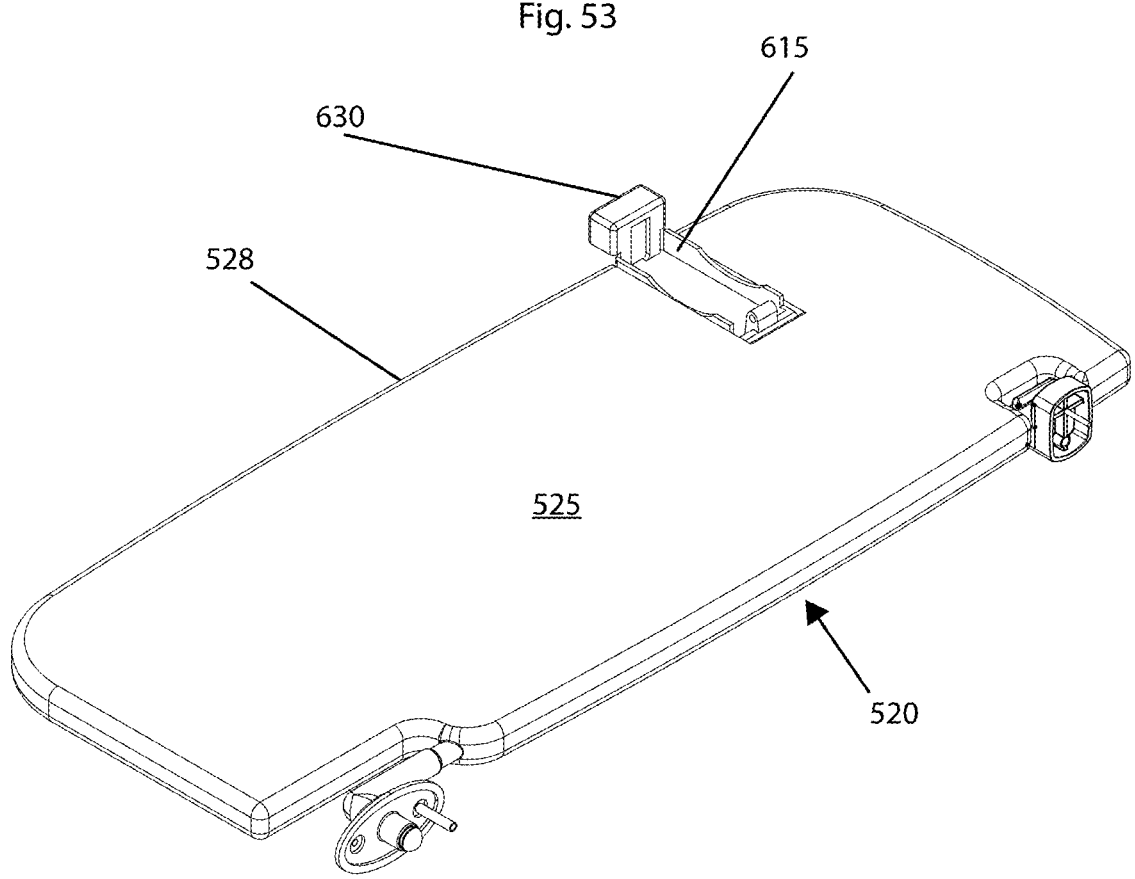
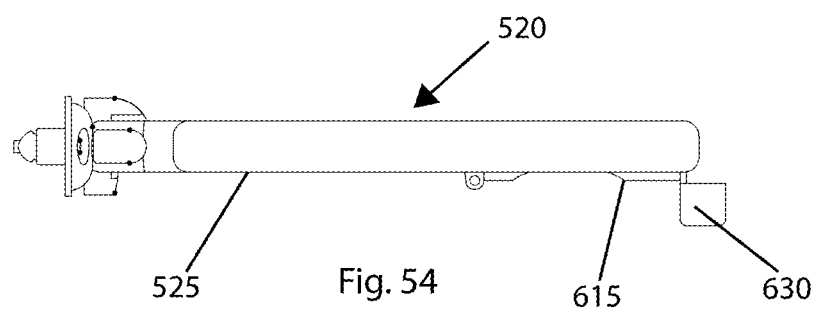

VISOR CLIP AND SUN VISOR ASSEMBLY EQUIPPED WITH VISOR CLIP

BACKGROUND

Field

The present invention generally relates to sun visors. More specifically, the present invention relates to a visor clip and to a sun visor assembly equipped with the visor clip.

Background Information

Sun visors have been primarily provided in motor vehicles for blocking sunlight shining through the windshield. Additionally, sun visors are also used to hold various items such as, for example, sunglasses and driving glasses.

Clips have been used to hold or grip a variety of items, such as sunglasses, on a vehicle sun visor. These clips are typically removably attached to a free side edge of the sun visor after which the various items are held or gripped by the clips while attached to the sun visor. A disadvantage to using such sun visor clips is that vehicle visors are subjected to vibrations from the vehicle. As a result of such vibrations, the clips require substantial holding and clamping force. The required holding and clamping force increase as the overall weight of the items held by the clip increases. Furthermore, such clips tend to slide off the sun visor as a result of vehicle vibrations or during movement of the sun visor by the driver/passenger to block sunlight, for example.

There is, therefore, a need to for a visor clip and sun visor assembly equipped with the clip that overcomes the foregoing and other related disadvantages in the prior art.

SUMMARY

The present disclosure is directed to a visor clip and to a sun visor assembly equipped with the visor clip configured to securely hold various articles and items, including sun glasses and driving glasses, on the sun visor to allow convenient access. The visor clip and sun visor assembly equipped with the visor clip is further configured to provide substantial holding and clamping force to prevent the article(s) and item(s) from being dislodged from the visor clip and sun visor assembly due to expected and unexpected motion (e.g., vibrations) of the vehicle equipped with the sun visor assembly, and/or movement of the sun visor by the driver/passenger to block sunlight, for example.

In a first aspect, the present invention provides a visor clip according to a first embodiment for use in combination with a sun visor. The visor clip has a clip body having a first leg, a second leg and a third leg. The first leg defines a holding portion for securely holding an article relative to and against a main body portion of the sun visor. The second leg includes a pivot section configured to be integrally mounted and anchored to the sun visor so as to allow the clip body to pivot relative to sun visor between closed and open positions. The third leg supports a biasing member, the clip body being configured to be selectively manually displaced from the closed position to the open position against the bias of the biasing member.

In an example of the first embodiment, a first cushion member is mounted on the first leg of the clip body and a second cushion member mounted on the main body portion of the sun visor for contacting the first cushion member in the closed position of the clip body.

In another example of the first embodiment, the biasing member comprises a leaf spring.

In yet another example of the first embodiment, the pivot section is configured to be inserted into an aperture formed in the main body portion of the sun visor and integrally mounted and anchored therein.

In a visor clip according to a second embodiment of the first aspect, the cushion member of the first leg is formed with a serrated surface having a saw-like appearance with tooth-like projections. A front end of the clip body is oriented outwardly relative to the first leg.

In a second aspect, the present invention provides a sun visor assembly equipped with the visor clip according to the first embodiment of the first aspect. In an exemplary embodiment, the sun visor assembly is a sun visor assembly for a motor vehicle.

In another embodiment of the second aspect, the present invention provides a sun visor assembly equipped with the visor clip according to the second embodiment of the first aspect. In an exemplary embodiment, the sun visor assembly is a sun visor assembly for a motor vehicle.

A sun visor assembly according to another embodiment comprises a visor having a recess, a first clip portion, and a second clip portion configured to be integrally mounted in the recess of the visor. The second clip portion is configured for connection to the first clip portion to allow the first clip portion to undergo pivotal movement relative to the second clip portion between open and closed states of the first clip portion. The first and second clip portions together form a cavity for securely accommodating and releasable holding an item in the closed state of the first clip portion.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The foregoing summary, as well as the following detailed description of preferred embodiments of the disclosure, will be better understood when read in conjunction with the accompanying drawings. For the purpose of illustrating the disclosure, there is shown in the drawings embodiments which are presently preferred. It should be understood, however, that the disclosure is not limited to the precise arrangement and instrumentalities shown.

FIG. 11 is a side view of a sun visor assembly according to an exemplary embodiment of a second aspect employing a visor clip according to the first embodiment of the present invention;

FIG. 12 is a front view of the sun visor assembly in FIG. 11;

FIG. 13 is a top elevational view of the sun visor assembly in FIG. 11;

FIG. 14 is a top perspective view of the sun visor assembly in FIG. 11;

FIG. 19 is an exploded top perspective view of the sun visor assembly in FIG. 11;

FIG. 20 is another exploded perspective view of the sun visor assembly in FIG. 11;

FIG. 21 is another exploded perspective view of the sun visor assembly in FIG. 11;

FIG. 22 is an exploded bottom perspective view of the sun visor assembly in FIG. 11;

FIG. 23 is another exploded perspective view of the sun visor assembly in FIG. 11;

FIG. 24 is an enlarged view of section A in FIG. 23;

FIG. 25 is a side view of the sun visor assembly similar to FIG. 11, except that the visor clip is shown in a biased state as compared to the unbiased state of the visor clip in FIG. 11;

FIG. 26 is a front view of the sun visor assembly in FIG. 25;

FIG. 27 is a top elevational view of the sun visor assembly in FIG. 25;

FIG. 28 is a perspective view of the sun visor assembly in FIG. 25;

FIG. 38 is a top perspective view of a sun visor clip assembly according to a second embodiment of the first aspect employing a visor clip of the first aspect according to a third embodiment of the present invention;

FIG. 39 is a top elevational view of the sun visor clip assembly of FIG. 38;

FIG. 53 is a top perspective view of the sun visor clip assembly shown in FIG. 52; and FIG. 54 is a side view of the sun visor clip assembly shown in FIG. 52.

DETAILED DESCRIPTION

Figure 1:
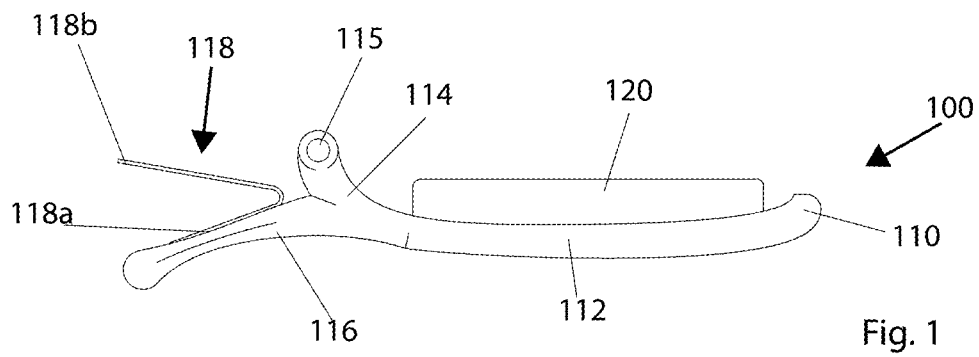
FIG. 1 is a side view of the visor clip according to a first embodiment of a first aspect of the present invention.
Figure 2:
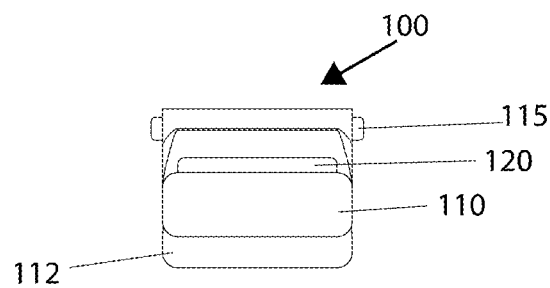
FIG. 2 is a front view of the visor clip in FIG. 1.

The present disclosure now will be described more fully hereinafter with reference to the accompanying drawings, in which exemplary embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

The word "exemplary" is used herein to mean "serving as an example, instance, or illustration". Any embodiment described herein as "exemplary" is not necessarily to be construed as preferred or advantageous over other embodiments.

For convenience of description, the terms "front", "back", "upper", "lower", "top", "bottom", "front", "rear", "right", "left", "side" and words of similar import will have reference to the various members and components of the exercise device of the present disclosure as arranged and illustrated in the figures of the drawings and described hereinafter in detail.

It should also be understood that the terms "about," "approximately," "generally," "substantially" and like terms, which may be used herein when referring to a dimension or characteristic of a component of the present disclosure, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

FIGS. 1-10 show various views of a first embodiment of a visor clip, generally designated with numeral 100, according to a first aspect of the present invention. Visor clip 100 is configured to be securely integrated with a visor, generally designated with reference numeral 200, as described below with reference to the embodiment shown in FIGS. 11-28. Visor 200 is configured as a motor vehicle sun visor, for example. In this regard, visor 200 includes standard connecting members 216, 218 for mounting visor 200 to the interior of a motor vehicle (e.g., on the driver and/or passenger sides) to allow visor 200 to be pivoted (e.g., up and down) as is known in the conventional art. As further described below with reference to the embodiment of FIGS. 11-28, a second aspect of the present invention is a sun visor assembly, generally designated with reference numeral 300, including visor clip 100 and visor 200 according to the present invention.

Referring to FIGS. 1-10, visor clip 100 is formed of a clip body 110 including a first leg 112, a second leg 114, and a third leg 116. As further described below with reference to FIGS. 29-30, first leg 112 defines a clamping or holding portion of visor clip 100 for securely clamping/holding various articles and items against a main body portion 212 of a visor body 210. First leg 112 includes a cushion member 120 configured for contacting a corresponding cushion member 220 provided on main body portion 212 of visor body 210.

Second leg 114 includes a pivot section 115 configured to be integrally mounted and anchored to visor 200 so as to allow visor clip 100 to pivot relative to visor 200 between closed and open positions as further described below.

Third leg 116 supports a biasing member 118 that allows visor clip 100, including first leg 112, to be pivoted about pivot section 115 relative to visor body 210. More specifically, biasing member 118 has a first portion 118*a* integrally secured to second leg 114 of clip body 110 and a second portion 118*b* configured to contact main body portion 212 of visor body 210 as shown in FIGS. 11 and 14, for example. By this construction, first leg 112 of visor clip 100 is configured to be pivoted away from main body portion 212 of visor body 210 against the bias of biasing member 118. This permits visor clip 100 to be selectively displaced or moved from a first position (FIGS. 11-14) relative to visor 200, in which clip 100 is in a closed position with cushion member 120 being disposed in contact with cushion member 220, to a second position (FIGS. 25-28) relative to visor 200, in which clip 100 is an opened position with cushion member 120 being removed out of contact with spaced apart from cushion member 220. In the closed position (FIGS. 29-30), visor clip 100 is configured to securely clamp/hold various items (e.g., sun glasses, eye glasses) against main body portion 212 of visor body 210. Displacement of visor clip 100 (i.e., via first leg 112) from the closed position to the open position can be accomplished manually by a user (e.g., motor vehicle driver or passenger) against the bias of biasing member 118.

In the exemplary embodiment shown in the figures, biasing member 118 is in the form of a leaf spring. It is understood, however, that other forms of the biasing member are suitable so long as visor clip 100 is permitted to be placed from the closed position to the open position and back to the closed position to securely clamp/hold the various items as described above.

In an exemplary embodiment, clip body 110 is formed from one-piece of continuous material, such as a suitable metal or hard plastic material. Cushion members 120, 220 are preferably formed of any cushioning material capable of protecting the item(s) being clamped or held (e.g., sun glasses, eye glasses, etc.) by visor clip 100 relative to main body portion 212 of visor body 210. For example, plastic foams made of polyethylene, polypropylene, flexible polyurethane and copolymers of polyethylene with polystyrene may be used for the cushioning material.

FIGS. 11-30 show various views of sun visor assembly 300 according to the second aspect of the present invention. FIGS. 11-14 illustrate sun visor assembly 300 with visor clip 100 in a closed position, FIGS. 15-24 illustrate exploded views of sun visor assembly 300, FIGS. 25-28, and FIGS. 29-30 illustrate sun visor assembly 300 during use.

As described above, visor clip 100 is configured to be securely integrated with visor 200 so that visor clip 100 is permitted to pivot about pivot section 115 relative to visor 200. As best shown in FIGS. 13, 14, 21 and 23, visor clip 100 is mounted to visor 200 so as to be accessible by the user along a lateral edge 214 of visor 200 opposite to a lateral edge of visor 200 provided with connecting members 216, 218.

With reference to FIGS. 19-24, main body portion 212 of visor 200 is provided with an aperture 222 for securely receiving pivot section 115 of visor clip 100. In an exemplary embodiment, pivot section 115 is inserted into aperture 222 and securely held therein via friction fit while allowing pivotal movement of visor clip 100 relative to visor 200. In an alternative exemplary embodiment, pivot section 115 is inserted into aperture 222 and secured therein using suitable fasteners so as to permit pivotal movement of visor clip 100 relative to visor 200. In yet a further exemplary embodiment, visor clip 100 may be securely integrally mounted to main body portion 212 of visor 200 using any means other than via aperture 222 and/or suitable fasteners provided therein. For example, visor clip 100 may be securely integrally mounted on main body portion 212 of visor 200 using suitable fasteners so as to permit pivotal movement of visor clip 100 relative to visor 200. In any of the foregoing exemplary embodiments, when visor clip 100 is securely integrally mounted to visor 200, second portion 118*b* of biasing member 118 is configured to rest on main body portion 212 of visor 200, as shown in FIGS. 11, 14 and 25, so that visor clip 100 is biased to the closed position as described above and shown in FIGS. 11-14.

FIGS. 25-28 show visor clip 100 securely integrally mounted to visor 200 and in the open position as described above. Visor clip 100 is placed in the open position by the user's hands (not shown), for example, in the process of positioning the item between cushion member 120 of visor clip 100 and cushion member 220 of visor 200. After positioning of the item as described above, the user releases visor clip 100 which is biased to the closed position as shown in FIGS. 11-14.

Figure 29:
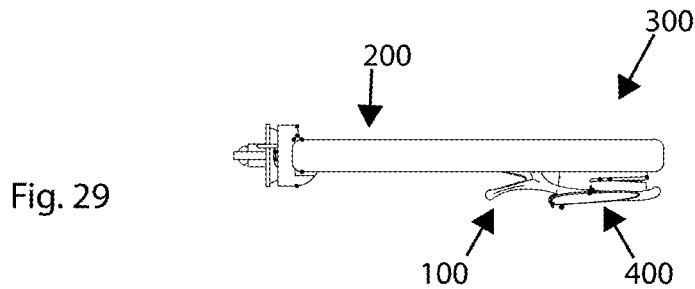
FIG. 29 is a view of the sun visor assembly similar to FIG. 11 illustrating an exemplary embodiment in which the visor clip securely holds a pair of glasses.
Figure 30:
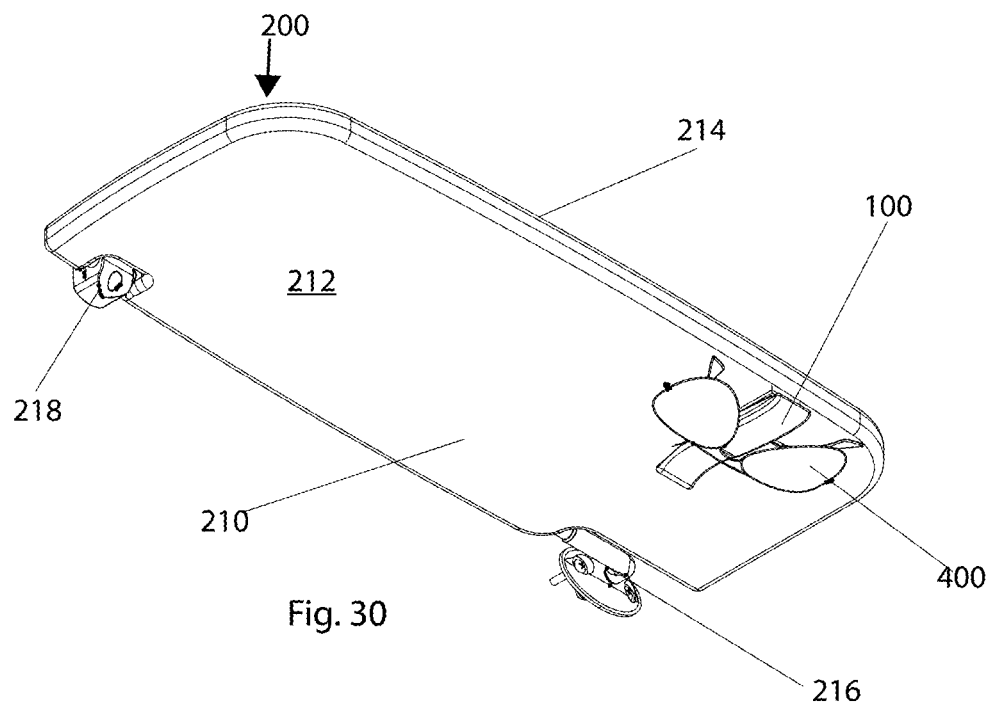
FIG. 30 is a perspective view of the sun visor assembly of FIG. 29.
Figure 31:
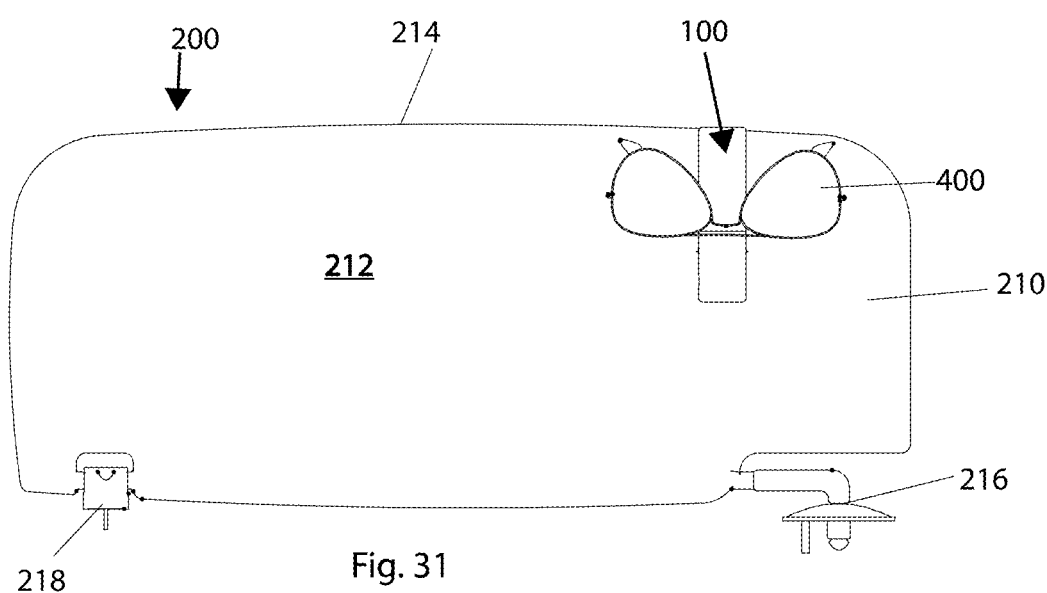
FIG. 31 is a front view of the sun visor assembly of FIG. 30.

FIGS. 29-31 show an exemplary embodiment of the manner of using the sun visor assembly 300 according to the present invention. FIG. 29 is a view of the sun visor assembly similar to FIG. 11 illustrating an exemplary embodiment in which sun visor assembly 300 securely holds a pair of glasses 400. FIG. 30 is a perspective view of the sun visor assembly 300 of FIG. 29, and FIG. 31 is a front view of the sun visor assembly 300 of FIG. 29.

As shown in FIGS. 29-31, glasses 400 are securely clamped/held by sun visor assembly 300, i.e., glasses 400 are clamped/held by and between visor clip 100 and visor 200. More specifically, as best shown in FIGS. 30-31, in this embodiment the bridge and/or temples of glasses 400 are securely held between and protected by cushion members 120 of visor clip 100 and cushion member 220 of sun visor 200. By this arrangement, sun visor assembly 300 is effective to prevent the glasses from being lost, broken or scratched. Sun visor assembly 300 is therefore designed to securely hold (i.e., by providing substantial holding or clamping force) and protect glasses (e.g., sun glasses and eye glasses) on a motor vehicle sun visor while providing convenient access to the glasses by vehicle drivers and passengers. Sun visor assembly 300 accomplishes this without touching the lenses of glasses 400, as shown in FIGS. 30-31. Because sun visor assembly 300 only touches the bridge and/or temples of glasses 400, there is easy insertion and extraction of glasses 400. Sun visor assembly prevents glasses 400 from escaping the security of sun visor assembly 300 due to expected and unexpected vehicle motion.

Figure 33:
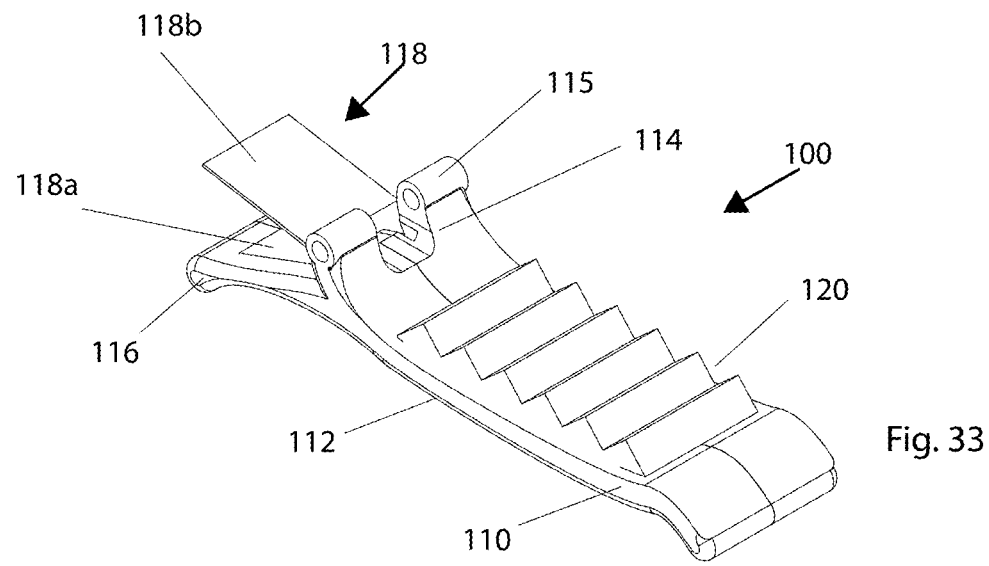
FIG. 33 is a bottom perspective view of the visor clip in FIG. 32.
Figure 34:
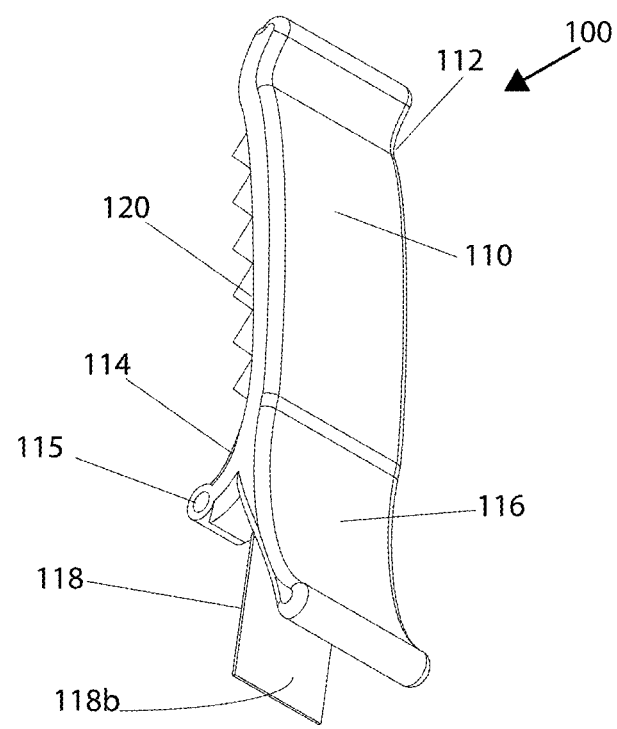
FIG. 34 is a top elevational perspective view of the visor clip in FIG. 32.
Figure 35:
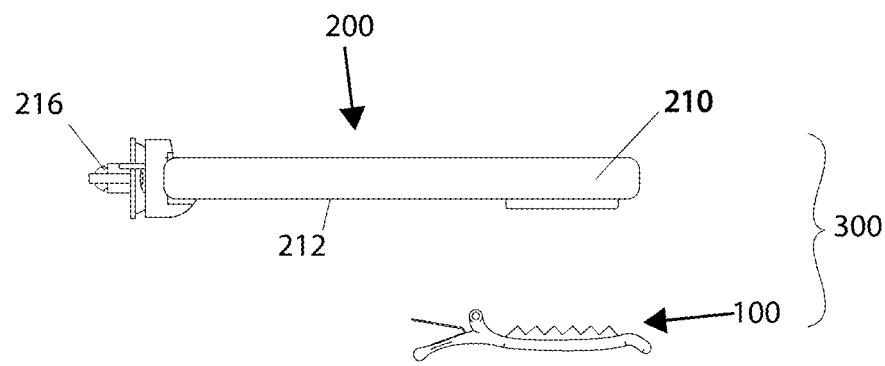
FIG. 35 is an exploded side view of the sun visor assembly according to the first aspect, except that the assembly incorporates the visor clip according to the second embodiment shown in FIG. 32.
Figure 36:
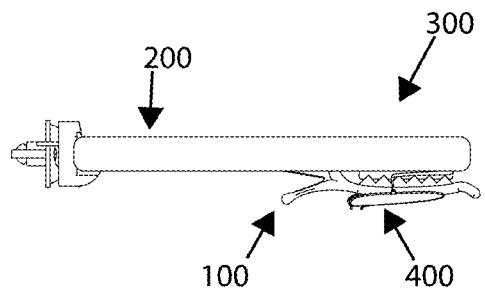
FIG. 36 is an assembled view of the sun visor assembly shown in FIG. 35, with the visor clip securely holding a pair of glasses.
Figure 37:
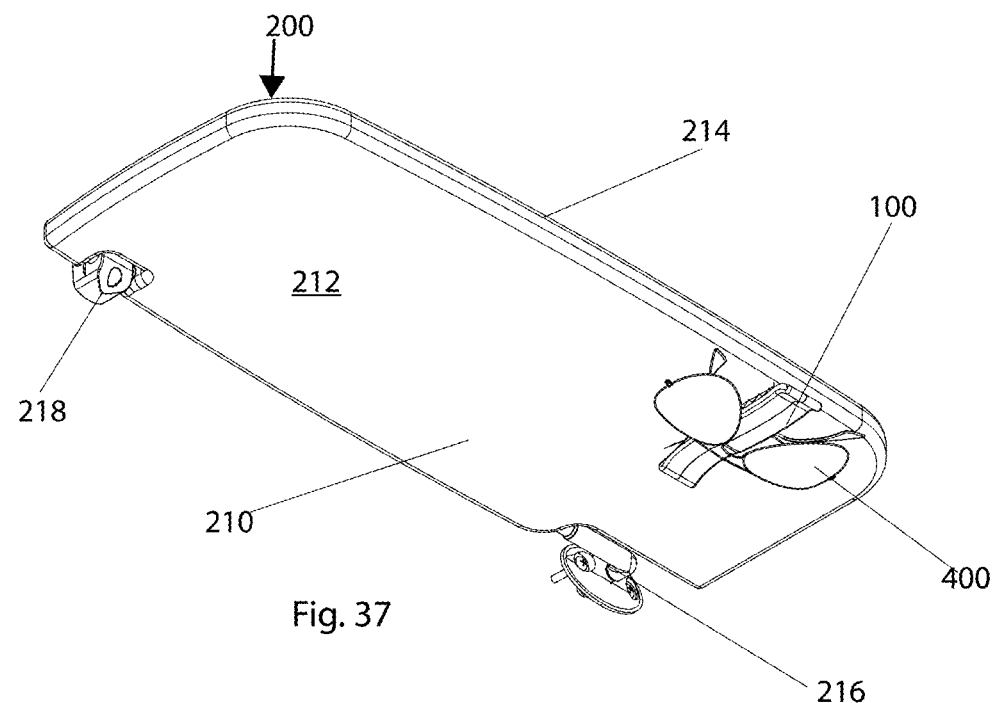
FIG. 37 is a perspective view of the sun visor assembly of FIG. 30.
Figure 40:
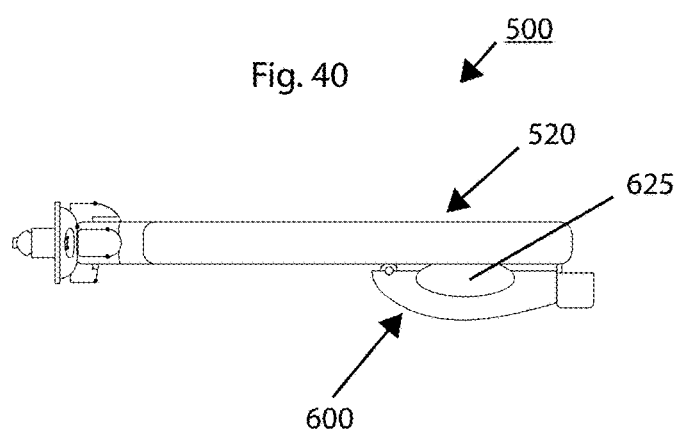
FIG. 40 is a side view of the sun visor clip assembly of FIG. 38.
Figure 41:
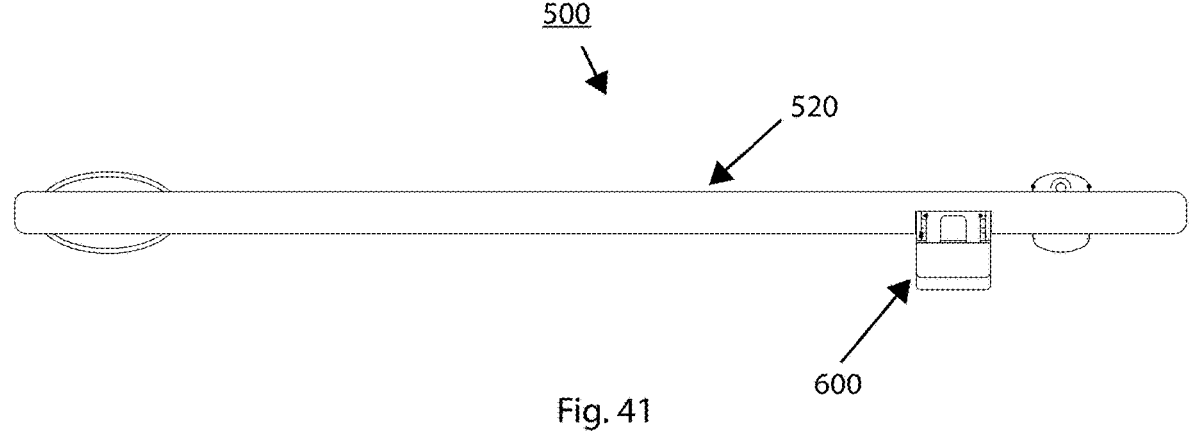
FIG. 41 is a front view of the sun visor clip assembly of FIG. 40.
Figure 42:
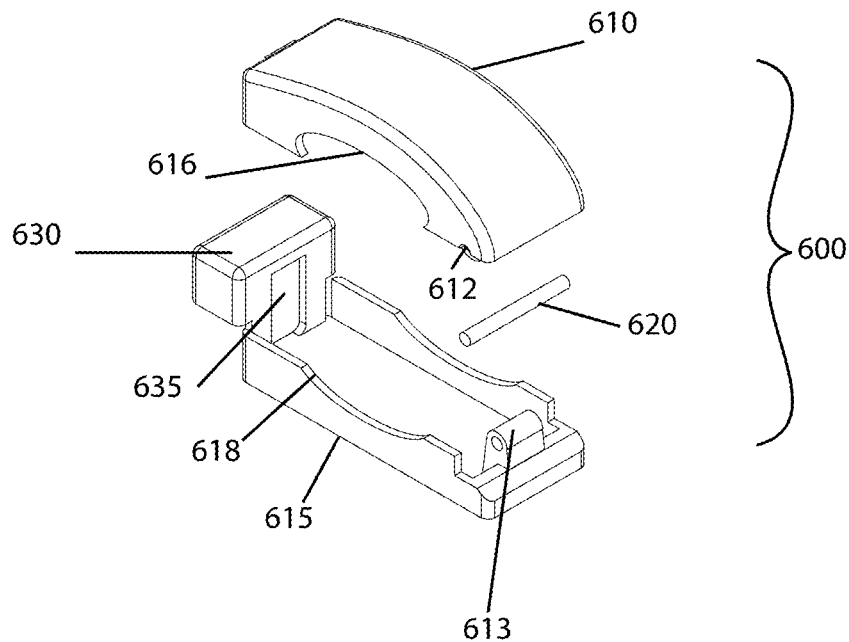
FIG. 42 is an exploded perspective view of the visor clip according to the third embodiment.

FIGS. 32-37 show a visor clip 100 according to a second embodiment of the present invention. As shown in FIGS. 35-37, visor clip 100 of the second embodiment is configured for use with visor 200 described above with reference to FIGS. 11-31 to form sun visor assembly 300. Visor clip 100 of the second embodiment has the same construction as visor clip 100 described above for the first embodiment, except as further described below.

Figure 3:
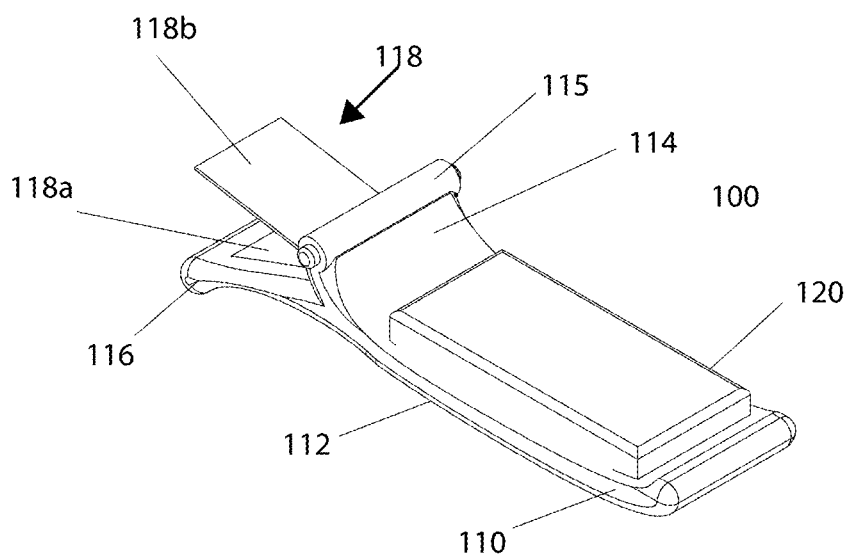
FIG. 3 is a bottom perspective view of the visor clip in FIG. 1.
Figure 4:
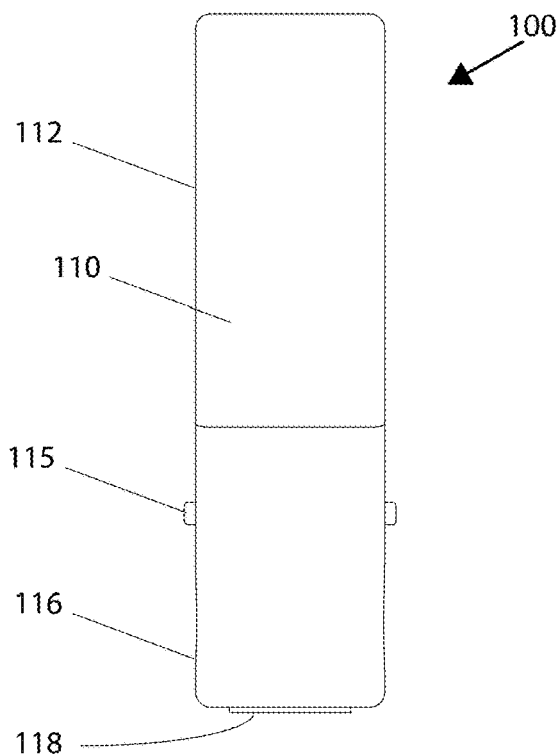
FIG. 4 is a top elevational view of the visor clip in FIG. 1.
Figure 5:
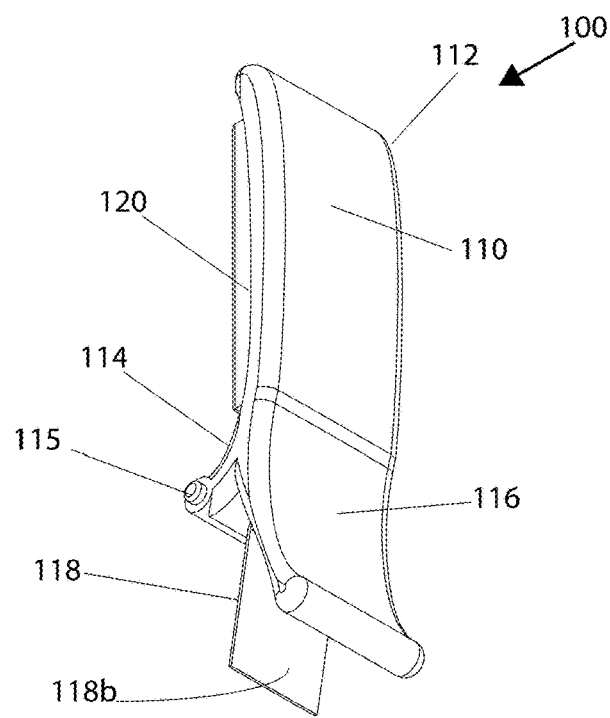
FIG. 5 is a top elevational perspective view of the visor clip in FIG. 1.
Figure 6:
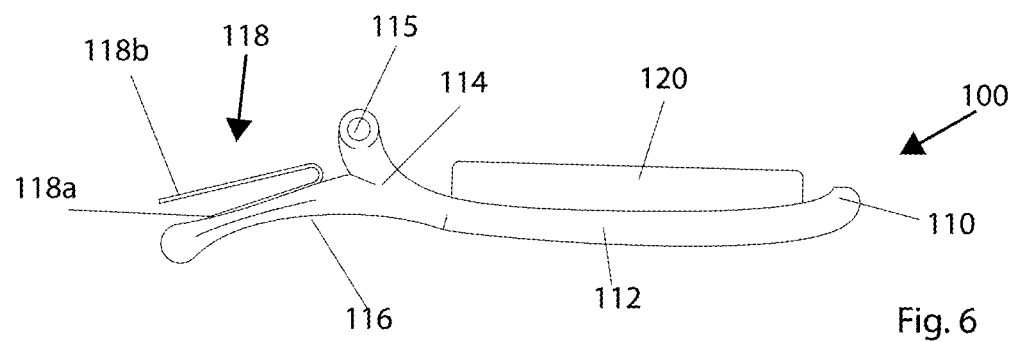
FIG. 6 is a side view of the visor clip similar to FIG. 1, except that the visor clip in FIG. 6 is shown in a biased state as compared to the unbiased state of the visor clip in FIG. 1.
Figure 7:
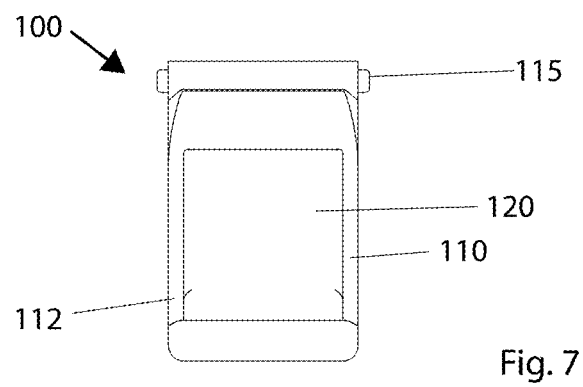
FIG. 7 is a front view of the visor clip in FIG. 6.
Figure 8:
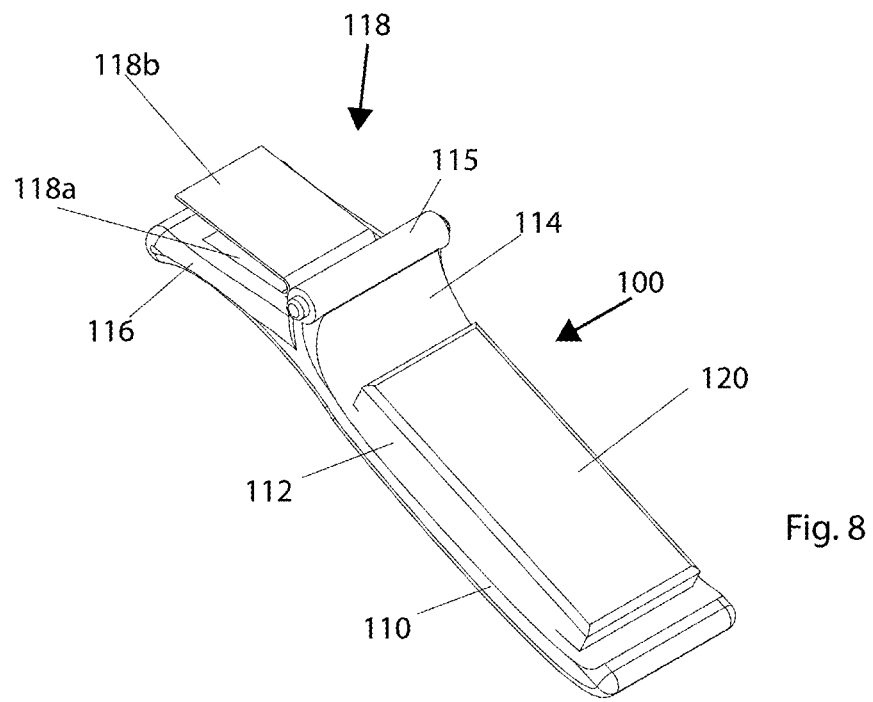
FIG. 8 is a bottom perspective view of the visor clip in FIG. 6.
Figure 9:
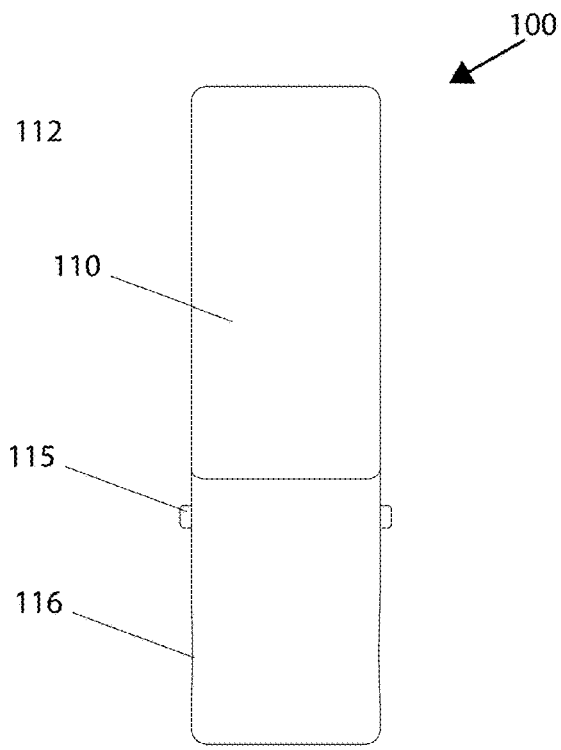
FIG. 9 is a top elevational view of the visor clip in FIG. 6.
Figure 10:
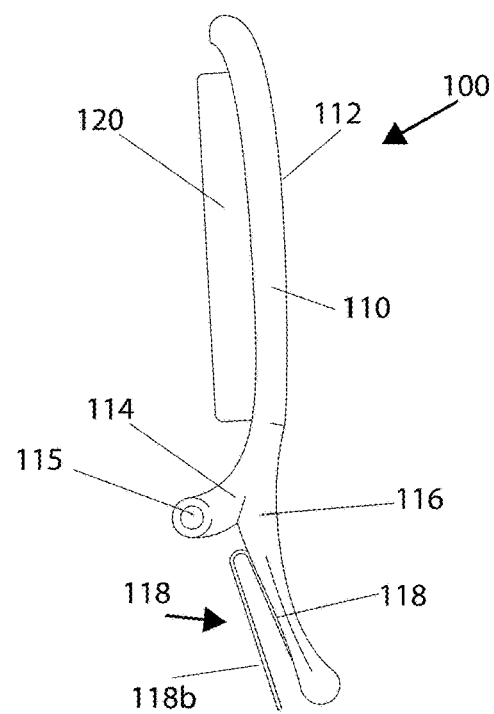
FIG. 10 is a side elevational view of the visor clip in FIG. 6.
Figure 15:
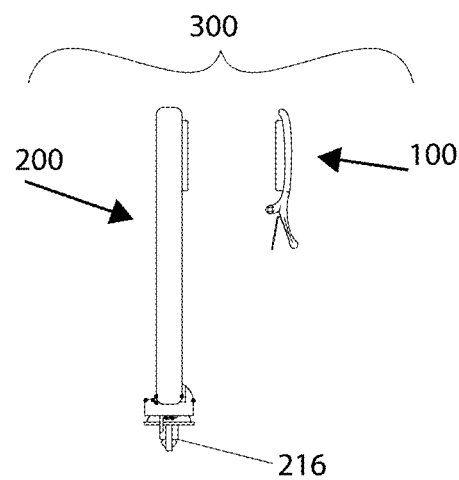
FIG. 15 is an exploded elevational view of the sun visor assembly in FIG. 11.
Figure 16:
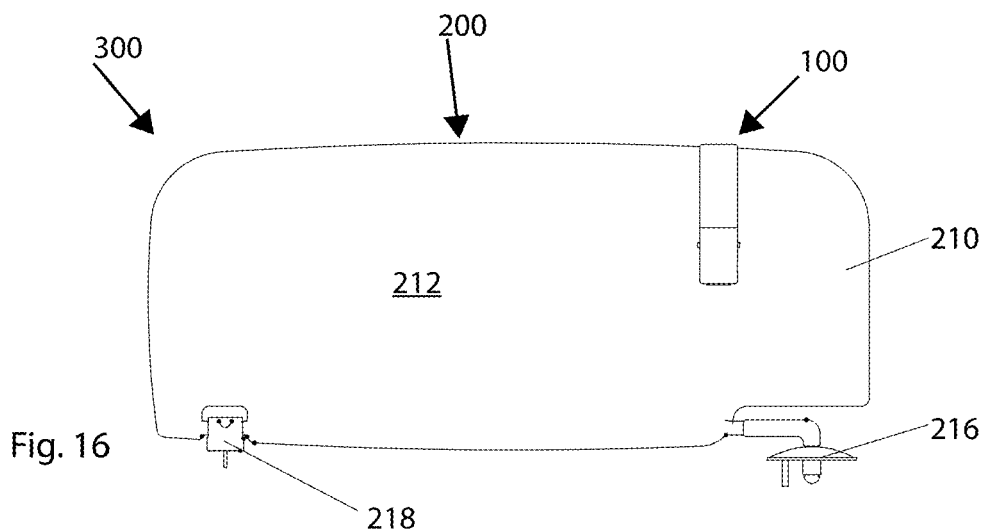
FIG. 16 is a top elevational view of the sun visor assembly in FIG. 11.
Figure 17:
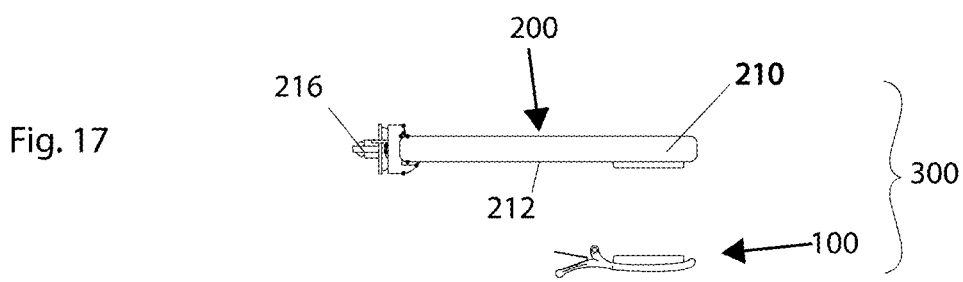
FIG. 17 is an exploded side view of the sun visor assembly in FIG. 11.
Figure 18:
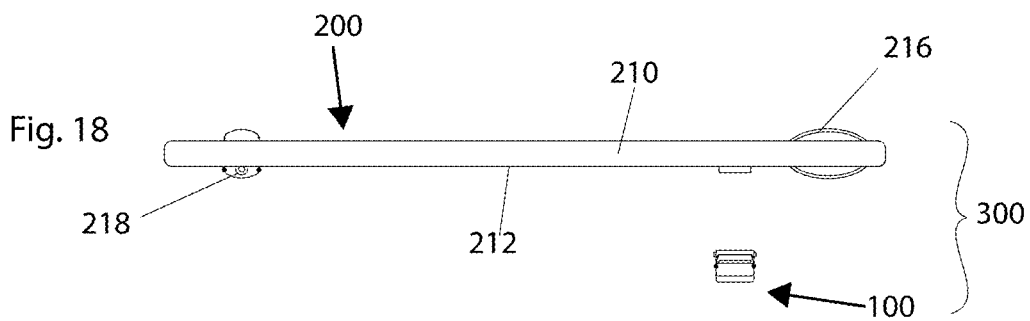
FIG. 18 is an exploded front view of the sun visor assembly in FIG. 11.
Figure 32:
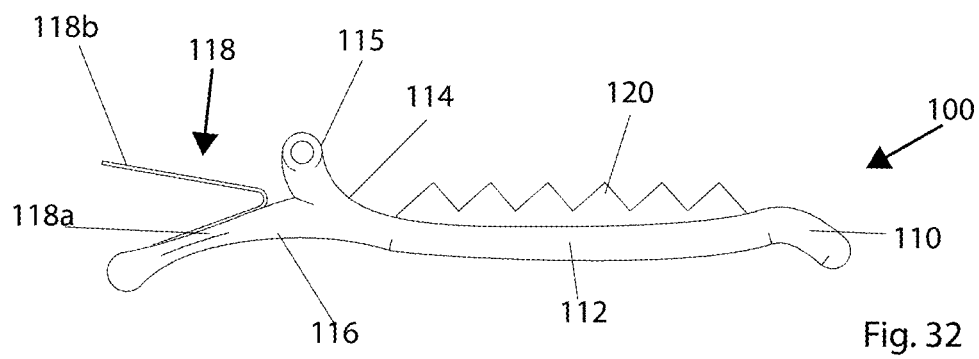
FIG. 32 is a side view of the visor clip according to a second embodiment of the first aspect of the present invention.

As shown in FIGS. 32-34, visor clip 100 of the second embodiment differs from visor clip 100 of the first embodiment in that cushion member 120 is formed with a serrated surface having a saw-like appearance with tooth-like projections. Serration angles between the tooth-like projections define holding portions for holding temple portions of glasses, for example, as shown in FIGS. 37-37. Another difference between visor clips 100 of the first and second embodiments is that pivot section 115 is formed in two parts, as shown in FIG. 33, instead of a single continuous part, as shown in FIG. 3.

Another difference between visor clips 100 of the first and second embodiments is that in the second embodiment the front end of clip body 110 is oriented outwardly relative to first leg 112 which is in a downward direction as shown in FIG. 32, that is, in a direction away from cushion member 120. On the other hand, in visor clip 100 of the first embodiment, the front end of clip body 110 is oriented upwardly relative to first leg 112 which is an upward direction as shown in FIG. 1, that is, in a direction towards cushion member 120. As can be appreciated from sun visor assembly 300 in FIGS. 36 and 37, the outward orientation of the front end of clip body 110 facilitates clipping of an item 400 (e.g., glasses) to visor 200 using visor clip 100 of the second embodiment. More specifically, the outward orientation of the front end of clip body 110 allows a user to press item 400 along the front end of clip body 110 to cause visor clip 100 to be pivoted about pivot section 115 relative to visor body 210 against the bias of biasing member 118 to position item 400 (e.g., temple portions of glasses) between the tooth-like projections of cushion member 120 as described above, at which point visor clip is allowed to spring back to the closed position. From the foregoing construction and operation of visor clip 100 according to the second embodiment, it will be appreciated that the user can easily clip the object to sun visor assembly 300 using only one hand. This is particularly convenient while the user is driving and can only utilize one hand to clip the object to sun visor assembly 300. In this regard, the foregoing design of visor clip 100 effectively promotes safety during use while the user is driving a vehicle incorporating the sun visor assembly 300.

FIGS. 38-54 show a sun visor assembly, generally designated 500, according to a second embodiment of the first aspect of the present invention. Sun visor assembly 500 includes a visor 520 and a visor clip, generally designated 600, according to a third embodiment of the second aspect of the present invention.

FIGS. 38-41 show assembled views of sun visor assembly 500 which includes standard connecting members 530, 535 for mounting sun visor assembly 500 to the interior of a motor vehicle (e.g., on the driver and/or passenger sides) to allow sun visor assembly 500 to be pivoted (e.g., up and down) as is known in the conventional art. Visor clip 600 is mounted on a main body portion 525 of visor 520 and extends to a region corresponding to a proximal edge 528 of visor 520.

Figure 43:
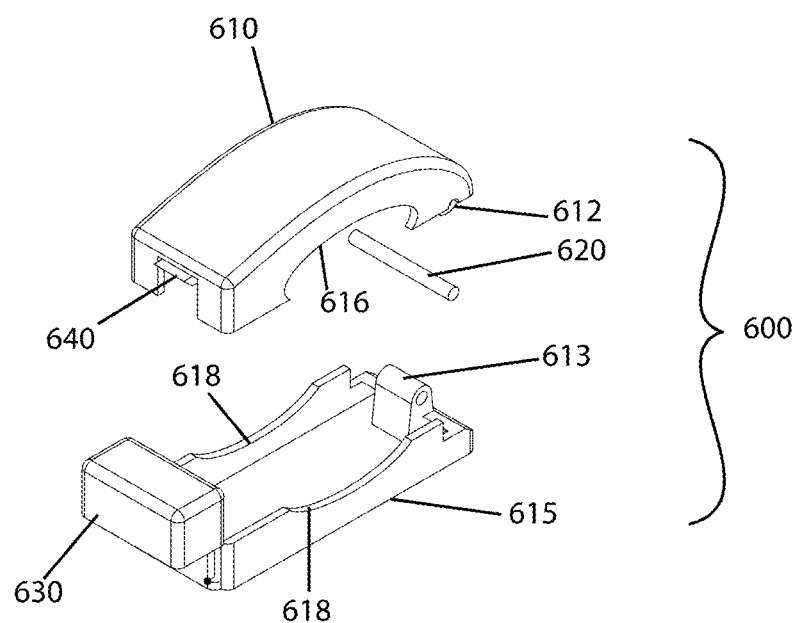
FIG. 43 is another exploded perspective view of the visor clip according to the third embodiment.
Figure 44:
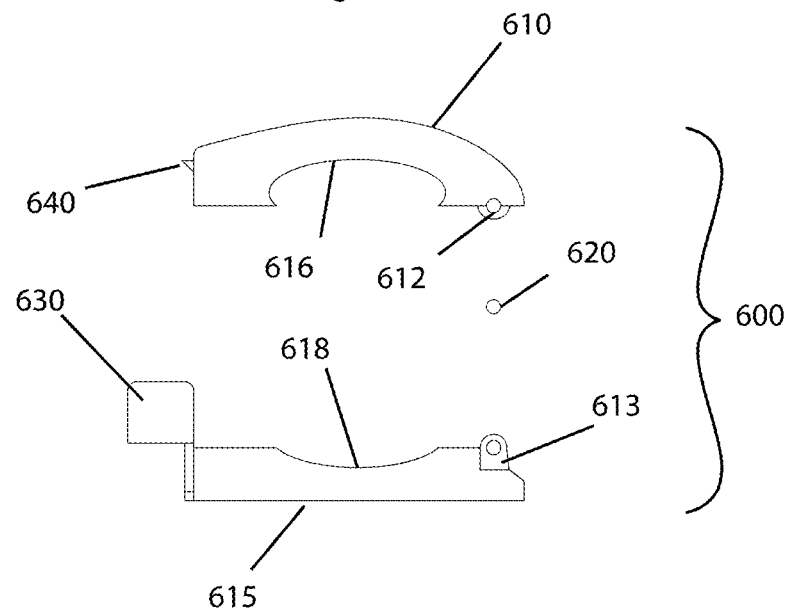
FIG. 44 is an exploded side view of the visor clip according to the third embodiment.
Figure 45:
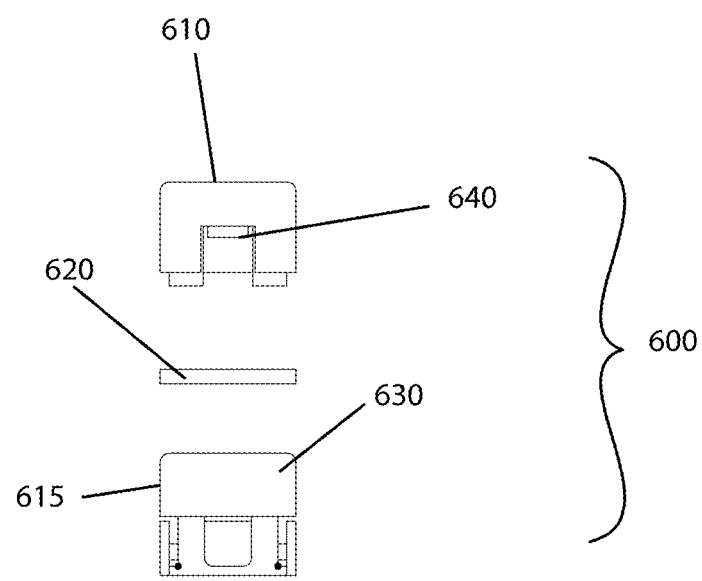
FIG. 45 is an exploded front view of the visor clip according to the third embodiment.

FIGS. 43-45 illustrate details of visor clip 600. Clip 600 includes a first clip portion 610, a second clip portion 615, and a pivot shaft 620 for connecting first clip portion 610 to second clip portion 615 to allow first clip portion to undergo pivotal movement relative to second clip portion 615 during use of sun visor assembly 500 as further described below. For this purpose, pivot shaft 620 is configured to be received and retained by cooperating support opening structures 612, 613 provided to first clip portion 610 and second clip portion 615, respectively, as shown in FIGS. 43-45. FIGS. 38-41 show first clip portion 610 in a closed state relative to second clip portion 615. In the closed state of first clip portion 610, sun visor assembly 500 is configured to securely releasable hold and retain an item (e.g., a pair of glasses) between first and second clip portions 110, 115.

First clip portion 610 has curved surface portions 616 configured to cooperate with curved surface portions 618 formed on second clip portion 615 to form a cavity 625 (FIGS. 38, 40) configured to securely releasable hold and support an item in the closed state of first clip portion 610 during use of sun visor assembly 500. Second clip portion 615 includes a release button 630 provided with a recess 635 configured to receive a catch element 640 provided to first clip portion 610 to securely releasable hold first clip portion 610 in the closed state as shown in FIGS. 38-41. First clip portion 610 is configured to be placed in an open state relative to second clip portion 615 upon release of catch element 640 from recess 635 which causes first clip portion 610 to pivot away from second clip portion 615 about pivot shaft 620. First clip portion 610 is placed in the closed state by pivoting first clip portion 610 about pivot shaft 620 in a direction towards second clip portion 615 until catch element 640 securely engages recess 635 of second clip portion 615.

Each of the first and second clip portions 610, 615 is preferably formed from one-piece of continuous plastic material, such as by a suitable injection molding process. Alternatively, first and second clip portions 610, 615 can be made of a suitable metal. The construction of second clip portion 615 is such that release button 630 is provided with sufficient flexibility to allow it to be displaced (e.g., by the hands of the user) sufficiently so as to enable recess 635 to selectively retain catch element 640 of first clip portion 610 (i.e., in a closed state of first clip portion 610 as shown in FIGS. 38-41) and to release catch element 640 of first clip portion 610 to place first clip portion in the opened state as described above.

Figure 46:
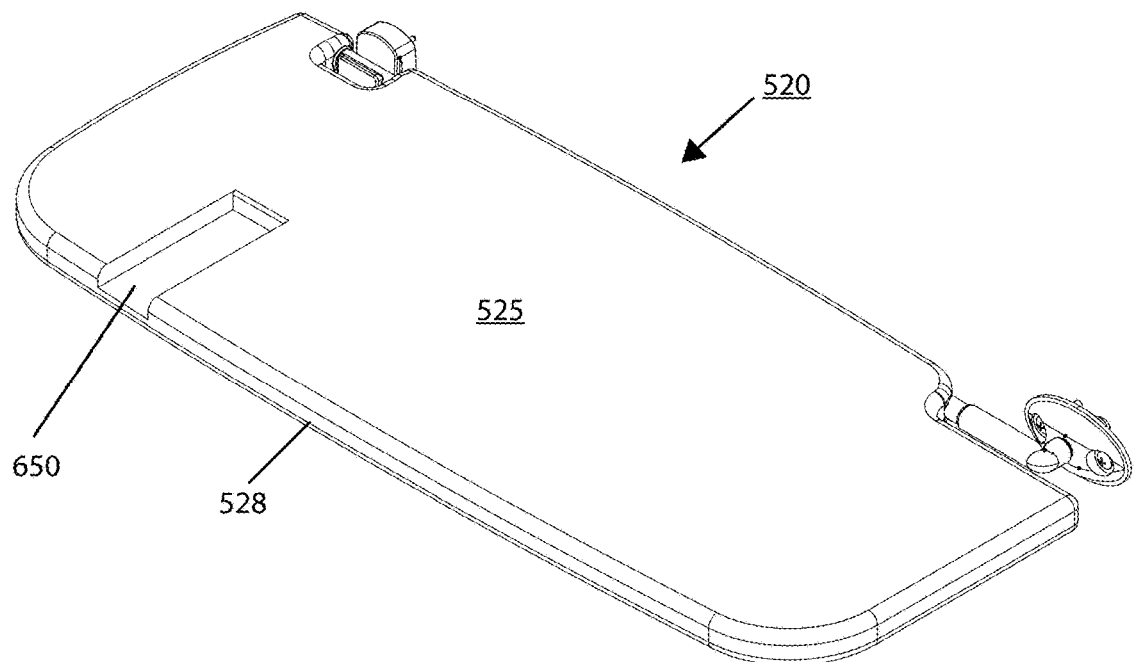
FIG. 46 is a top perspective view of the sun visor of the sun visor clip assembly of the second embodiment, with the visor clip removed.
Figure 47:
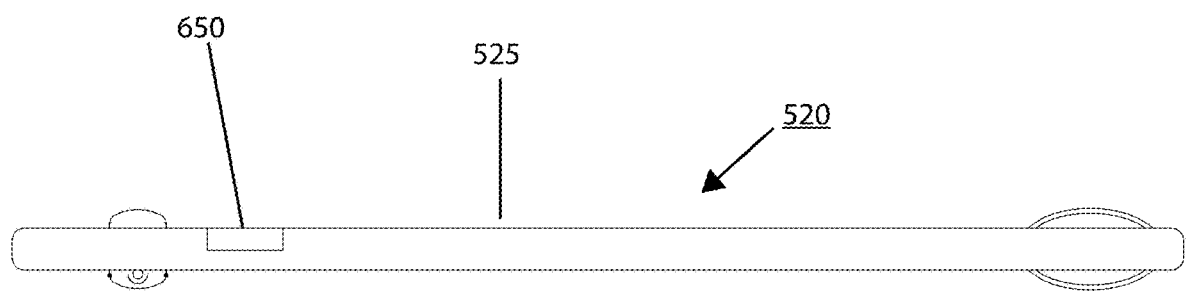
FIG. 47 is a front view of sun visor shown in FIG. 46.
Figures 48, 49:
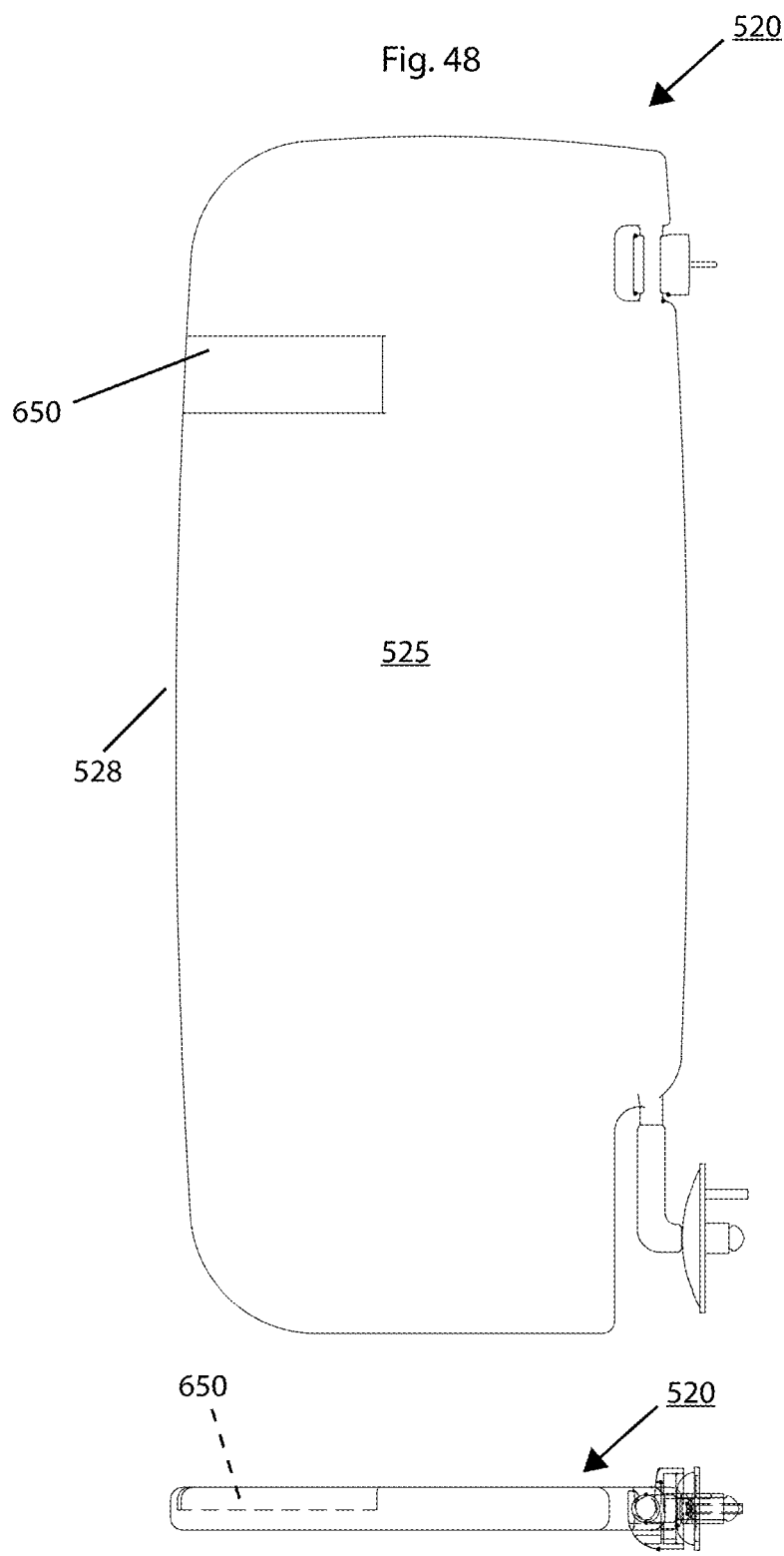
FIG. 48 is a top elevational view of the sun visor shown in FIG. 47.
FIG. 49 is a side view of the sun visor shown in FIG. 47.

Referring to FIGS. 46-49, visor 520 is formed with a recess 650 configured to receive therein second clip portion 615 of clip 600. Recess 650 is formed in main body portion 525 of visor 520 so as to extend to proximal edge 528 of visor 520 as shown in FIGS. 46-48. The dimensions of recess 650 is selected so that second clip portion 615 can be securely accommodated and retained therein, such as by friction fit. Alternatively, second clip portion 615 can be retained in recess 650 using suitable fasteners and/or adhesives.

Figure 50:
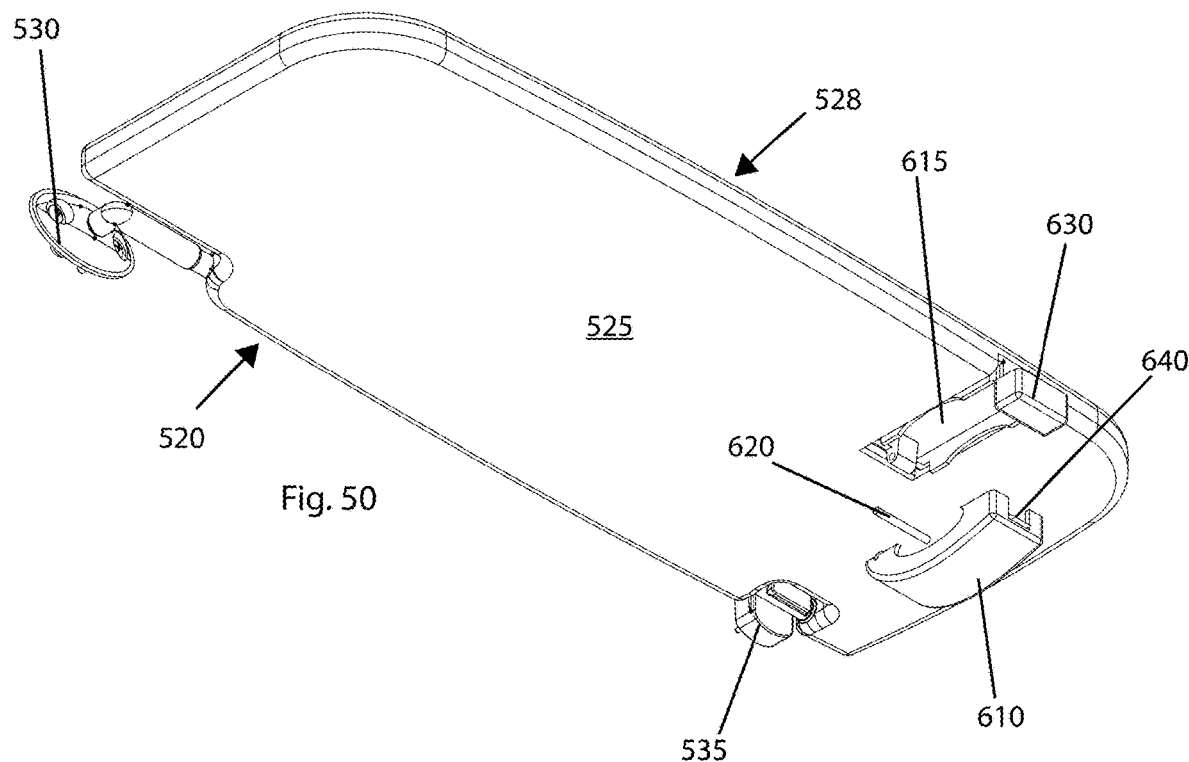
FIG. 50 is an exploded perspective view of the sun visor clip assembly according to the second embodiment of the present invention.
Figure 51:
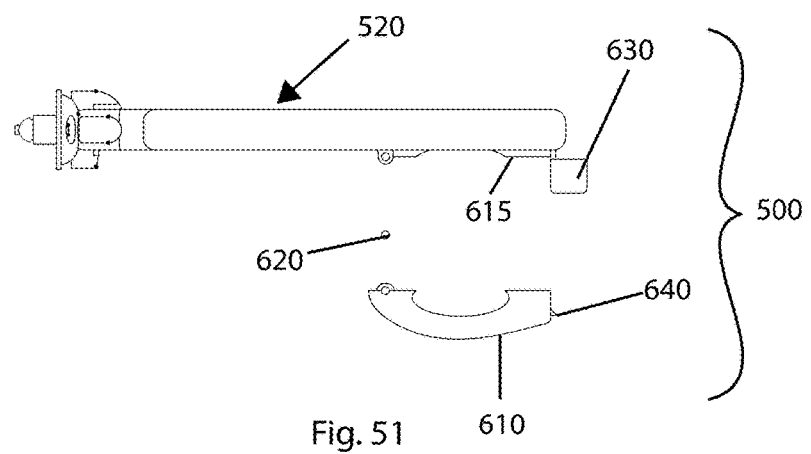
FIG. 51 is an exploded side view of the sun visor clip assembly of the second embodiment of the present invention.
Figure 52:
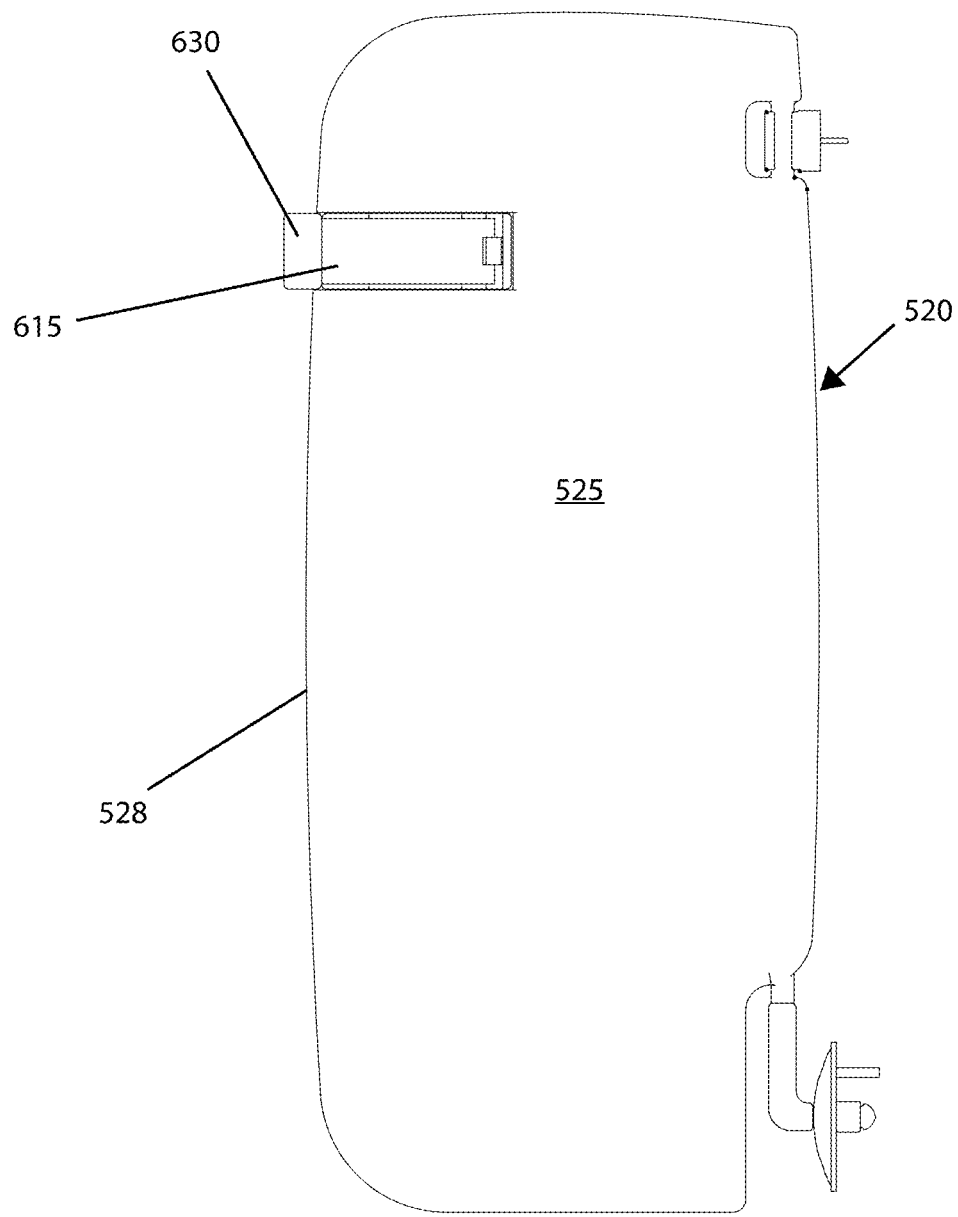
FIG. 52 is a top elevational view of the sun visor clip assembly of the second embodiment, with only one of the visor clip parts shown mounted to the sun visor.

FIGS. 50-51 are exploded views of sun visor assembly 500 showing first clip portion 610 disconnected from second clip portion 615. FIGS. 52-54 show second clip portion 615 securely accommodated within recess 650 of visor 520, with first clip portion 610 omitted for illustration purposes only.

As shown in FIGS. 50-54, the dimensions of second lip portion 615 and recess 650 are selected so that release button 630 of second clip portion 615 extends at least partially outwardly from recess 650 and from proximal edge 528 of visor 520. This allows release button 630 to be easily and conveniently accessible by the user to place first clip portion 610 of clip 600 between the open and closed states as described above. For example, a desired item can be selectively placed and securely retained (e.g., clipped) in cavity 625 formed between first and second clip portions 610, 615 by pivoting first clip portion 610 towards second clip portion 615 to cause recess 650 in release button 630 of second clip portion 615 to engage catch element 640 of first clip portion 610 to place first clip portion in the closed state (FIGS. 38-41). The desired item can then be removed from cavity 625 by manipulating (e.g., flexing) release button 630 sufficiently to cause catch element 640 to be released from recess 650 to place first clip portion 610 in the open state.

By the foregoing construction of sun visor assembly 500, it will be appreciated that a user can selectively clip a desired item on visor 520 via clip 600 and remove it therefrom as described above by using only a single hand, such as while driving a vehicle incorporating sun visor assembly 500. Clip 600 is also configured to provide sufficient holding and clamping force, particularly when sun visor assembly 500 is subjected to vibrations from the vehicle. The construction of sun visor assembly 500 also prevents clip 600 from sliding off visor 520 as a result of vehicle vibrations or during movement of visor 520 by the driver/passenger of the vehicle to block sunlight, for example.

While the exemplary embodiment described herein shows sun visor assembly 300 supporting glasses, it is understood that sun visor assembly is also configured and well adapted for securely holding items and articles other than glasses, such as garage door openers.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A visor clip for use in combination with a sun visor, the visor clip comprising:
   a clip body having a first leg, a second leg and a third leg, wherein:
   the first leg defines a holding portion for securely holding an article relative to and against a main body portion of the sun visor;
   the second leg includes a pivot section configured to be integrally mounted and anchored to the sun visor so as to allow the clip body to pivot relative to the sun visor between closed and open positions; and
   the third leg supports a biasing member, the clip body being configured to be selectively manually displaced from the closed position to the open position against the bias of the biasing member.

2. The visor clip of claim 1, further comprising a first cushion member mounted on the first leg of the clip body and a second cushion member mounted on the main body portion of the sun visor for contacting the first cushion member in the closed position of the clip body.

3. The visor clip of claim 1, wherein the biasing member comprises a leaf spring.

4. The visor clip of claim 1, wherein the pivot section is configured to be inserted into an aperture formed in the main body portion of the sun visor and integrally mounted and anchored therein.

5. The visor clip of claim 1, wherein the sun visor is a sun visor for a motor vehicle.

6. The visor clip of claim 1, wherein the clip body is formed from one-piece of material.

7. A sun visor assembly comprising:
   a sun visor having a main body portion; and
   a visor clip configured to be integrally mounted to the main body portion of the sun visor for undergoing relative movement between closed and open positions for securely holding an article relative to and against the main body portion of the sun visor;
   wherein the clip body has a first leg, a second leg and a third leg, wherein:
   the first leg defines a holding portion for securely holding an article relative to and against the main body portion of the sun visor;
   the second leg includes a pivot section configured to be integrally mounted and anchored to the sun visor so as to allow the clip body to pivot relative to the sun visor between closed and open positions; and
   the third leg supports a biasing member, the clip body being configured to be selectively manually displaced from the closed position to the open position against the bias of the biasing member.

8. The sun visor assembly of claim 7, further comprising a first cushion member mounted on the first leg of the clip body and a second cushion member mounted on the main body portion of the sun visor for contacting the first cushion member in the closed position of the clip body.

9. The sun visor assembly of claim 7, wherein the biasing member comprises a leaf spring.

10. The sun visor assembly of claim 7, wherein the pivot section is configured to be inserted into an aperture formed in the main body portion of the sun visor and integrally mounted and anchored therein.

11. The sun visor assembly of claim 7, wherein the sun visor assembly is a sun visor assembly for a motor vehicle.

12. The sun visor assembly of claim 8, wherein the first cushion member is formed with a serrated surface having a saw-like appearance with tooth-like projections.

13. The sun visor assembly of claim 8, wherein the clip body has a front end oriented outwardly relative to the first leg and in a direction away from the first cushion member.

14. A sun visor assembly comprising:
    a visor having a recess;

a first clip portion;

a second clip portion configured to be integrally mounted in the recess of the visor, the second clip portion being configured for connection to the first clip portion to allow the first clip portion to undergo pivotal movement relative to the second clip portion between open and closed states of the first clip portion, the first and second clip portions together forming a cavity for securely accommodating and releasably holding an item in the closed state of the first clip portion; and means for releasably holding the first clip portion in the closed state.

15. The sun visor assembly of claim 14, wherein the means for releasably holding comprises a catch element of the first clip portion and a recess of the second clip portion configured to releasably receive and retain the catch element in the closed state of the first clip portion.

16. The sun visor assembly of claim 15, wherein the second clip portion has a release button provided with the recess for receiving and retaining the catch element, the release button being configured to be selectively displaced relative to the first clip portion to cause the recess of the second clip portion to receive and retain the catch element in the closed state of the first clip portion and to cause the catch element to be released from the recess of the second clip portion in the open state of the first clip portion.

17. The sun visor assembly of claim 16, wherein each of the first and second clip portions is formed from one-piece of continuous plastic material.

18. The sun visor assembly of claim 16, wherein when the second clip portion is integrally mounted in the recess of the visor, the release button of the second clip portion extends outwardly from the recess of the visor and from a proximal edge of the visor.

19. The sun visor assembly of claim 14, further comprising a pivot shaft interconnecting the first and second clip portions to permit the first clip portion to undergo pivotal movement relative to the second clip portion.

20. The sun visor assembly of claim 14, wherein the sun visor assembly is a sun visor assembly for a motor vehicle.

* * * * *